(12) United States Patent
Wellens et al.

(10) Patent No.: US 7,662,199 B2
(45) Date of Patent: Feb. 16, 2010

(54) CYCLONIC FILTER FOR SURFACE MAINTENANCE MACHINE

(75) Inventors: Richard William Wellens, Minneapolis, MN (US); Michael Thomas Basham, Osseo, MN (US); Karl Hansen, Cottage Grove, MN (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 12/044,874

(22) Filed: Mar. 7, 2008

(65) Prior Publication Data

US 2008/0271420 A1     Nov. 6, 2008

Related U.S. Application Data

(60) Provisional application No. 60/893,560, filed on Mar. 7, 2007.

(51) Int. Cl.
*B01D 59/50* (2006.01)

(52) U.S. Cl. .............................. 55/337; 55/346; 55/343; 55/342; 55/356; 55/428; 55/467; 55/459.2; 55/459.3; 55/459.4; 15/340.3; 15/348; 15/349

(58) Field of Classification Search .................. 55/337, 55/346, 343, 342, 356, DIG. 3, 428, 467, 55/459.2–459.4; 15/340.3, 348, 349
See application file for complete search history.

(56) References Cited

U.S. PATENT DOCUMENTS

| | | | | |
|---|---|---|---|---|
| 1,997,125 A * | 4/1935 | Soyez et al. | ................. | 209/710 |
| 3,842,461 A * | 10/1974 | Wurster | ........................ | 15/326 |
| 3,955,236 A * | 5/1976 | Mekelburg | .................... | 15/314 |
| 4,007,026 A * | 2/1977 | Groh | ........................... | 55/302 |
| 4,578,840 A * | 4/1986 | Pausch | ........................ | 15/352 |
| 4,581,050 A * | 4/1986 | Krantz | ....................... | 55/315.2 |
| 4,715,872 A * | 12/1987 | Snyder | ........................ | 55/315 |
| 4,723,969 A * | 2/1988 | DeMarco | ..................... | 95/284 |
| 4,735,639 A * | 4/1988 | Johnstone | .................... | 55/302 |
| 4,790,865 A * | 12/1988 | DeMarco | ..................... | 55/337 |
| 4,820,315 A * | 4/1989 | DeMarco | ..................... | 95/268 |
| 4,869,737 A * | 9/1989 | Parenti | ........................ | 96/400 |
| 4,963,172 A * | 10/1990 | DeMarco | ..................... | 55/429 |
| 6,391,095 B1 | 5/2002 | Conrad et al. | | |
| 6,569,217 B1 * | 5/2003 | DeMarco | ..................... | 55/324 |
| 6,833,016 B2 * | 12/2004 | Witter | ......................... | 55/337 |
| 6,936,085 B2 * | 8/2005 | DeMarco | ..................... | 55/324 |
| 7,247,180 B1 * | 7/2007 | Hill | ............................. | 55/315 |
| 7,282,074 B1 * | 10/2007 | Witter | ......................... | 55/300 |
| 7,323,023 B2 * | 1/2008 | Michele et al. | ............... | 55/337 |
| RE40,048 E * | 2/2008 | Witter | ......................... | 55/337 |
| 7,387,478 B2 * | 6/2008 | Anderson et al. | ........... | 409/134 |

(Continued)

OTHER PUBLICATIONS

International Search Report for PCT/US08/59010, Apr. 1, 2008, 2 sheets.

*Primary Examiner*—Jason M Greene
*Assistant Examiner*—Dung Bui
(74) *Attorney, Agent, or Firm*—Briggs and Morgan, P.A.

(57) ABSTRACT

A filter system for a surface maintenance machine having a hopper assembly for receiving brush-thrown debris including a cyclonic separator for separating dust and debris from air drawn through the hopper via vacuum action. The cyclonic separator may include multiple cyclone and may be in fluid communication with the hopper assembly so as to periodically receive dust and debris exiting the filter system.

13 Claims, 26 Drawing Sheets

U.S. PATENT DOCUMENTS

| | | | |
|---|---|---|---|
| 7,550,021 B2 * | 6/2009 | Witter | 55/295 |
| 2004/0187449 A1 * | 9/2004 | Witter | 55/337 |
| 2005/0274094 A1 * | 12/2005 | DeMarco | 55/356 |
| 2006/0005346 A1 | 1/2006 | Rupp et al. | |
| 2006/0137308 A1 * | 6/2006 | Jeong et al. | 55/337 |
| 2006/0150591 A1 * | 7/2006 | Borinato | 55/385.1 |
| 2006/0162298 A1 * | 7/2006 | Oh et al. | 55/337 |
| 2007/0144117 A1 * | 6/2007 | Park et al. | 55/345 |
| 2008/0016830 A1 * | 1/2008 | Witter | 55/337 |

* cited by examiner

CYCLONIC FILTER FOR SURFACE MAINTENANCE MACHINE

This application claims priority under 35 U.S.C. 119(e) from provisional U.S. Patent Application No. 60/893,560 filed Mar. 7, 2007 the contents of which are incorporated herein by reference.

TECHNICAL FIELD

The present disclosure is directed to filtration systems for a mobile surface maintenance machine. More specifically, the present disclosure is directed to a filtration system utilizing a cyclonic filter assembly as a filter stage.

BACKGROUND OF THE INVENTION

Over the years various kinds of machines have been developed for cleaning and maintaining floors inside buildings, and paved outdoor areas such as streets, sidewalks and parking lots. They include such machines as rotary broom sweepers, vacuum sweepers, scarifiers, burnishers, polishers and scrubbers. For our purposes here they can be divided into machines which apply water to the surface being maintained and machines which operate dry. We are concerned with the latter, which would include many vacuum sweepers, scarifiers, and rotary broom sweepers. They all share one problem which is addressed by this invention. In their normal operation they tend to stir up dust from the surface being maintained. If it is not controlled, this dust is highly objectionable.

On many of these machines the problem has received one general solution. The functional tool which generates the dust, such as a rotary broom, a scarifier head, or a vacuum pickup, is provided with a cover and surrounded by walls which have rubber skirts that hang down almost to the surface being maintained. An on board exhaust blower continuously pulls air from the tool chamber thus created so there is a sub-atmospheric air pressure within it which eliminates outflow of dusty air from under the skirts. The blower exhausts this air to atmosphere. One or more air filters are placed in this air path, either upstream or downstream from the blower, to remove dust from the air before it is released so the discharge to atmosphere will be dust free.

An aspect of the present invention is to provide a cyclone dust-collector within a debris hopper of a surface cleaning machine having an improved construction which is capable of separating and collecting the fine particles efficiently.

The above aspect is achieved by providing a cyclonic prefilter which filters out dust and dirt from drawn-in air. In one example, the cyclonic prefilter includes multiple cyclone units for centrifugally separating the dust and dirt from the drawn-in air, and a cover unit defined as the upper housing of the cyclonic prefilter, for allowing the cyclone-filtered air to fluidly communicate with an air inlet of a filter box for subsequent filtering.

The cyclone units may comprise an air guide wall for inducing rotational flow to the air stream. A plurality of the funnel-shaped members may be arranged in a predetermined pattern, forming a multiple cyclone unit. The top housing may comprise a first cover connected to the upper portion of the multiple cyclone unit, and having centrifugal passages for guiding the air discharged from the cyclones to be a vortex, and discharge holes through which air exiting from the discharge holes is drawn.

BRIEF SUMMARY OF THE INVENTION

The present invention is directed to a filtration system for a mobile surface maintenance machine utilizing a cyclonic air filter stage. The cyclonic filters may prefilter air which subsequently passes through a primary filter. The filtration system can be vacuum-based. In one embodiment, the cyclonic filter stage is combined within a debris hopper to allow dust and debris to move out of the cyclonic filters and be deposited within the debris hopper. The communication of dust and debris may be achieved via one or more flaps which respond to pressure variations across the flap in order to open or close the flap.

In one embodiment, the prefilter includes a bank of cyclone filters. Air flow to each of the bank of cyclone filters may be controlled by an air channel. In one embodiment of the present invention some of the air channels route air to establish air flow in opposite directions, e.g., a clockwise and counter clockwise rotation of the air within some of the cyclones. A vacuum fan may be connected to a remote filter box housing.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

A conventional forward throw rotary broom sweeper will be used by way of example in the following description of the invention. However, it should be understood that, as already stated, the invention could as well be applied to other types of mobile surface maintenance machines, such as, for example, other types of rotary broom sweepers, scarifiers, and various types of vacuum sweepers.

Figure 1:
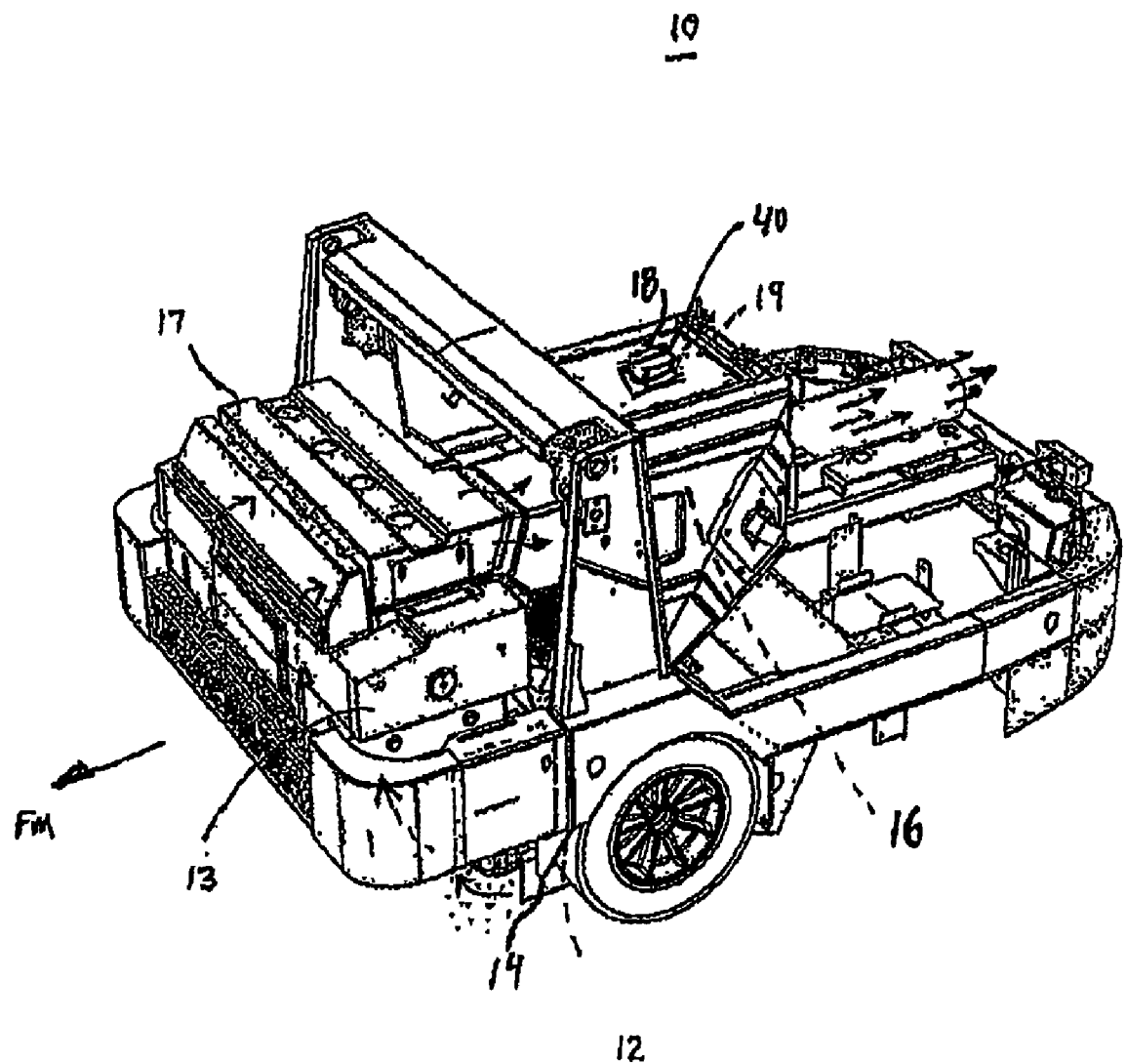
FIG. 1 is a perspective illustration of one embodiment of a cleaning machine utilizing a filter cleaning system in accordance with the present invention.

With reference to FIG. 1, there is shown an industrial sweeping machine 10. As illustrate, machine 10 is a forward throw sweeper with an intended direction of motion indicated by arrow marked FM. Machine 10 could as well be an over-the-top, rear hopper sweeper, a type which is also well known in the art. Machine 10 has a rotating cylindrical brush 12 for sweeping debris from a floor or other surface into a debris hopper 13. Hopper arms (not shown) allow hopper 13 to be lifted during a dumping procedure. The brush chamber generally encloses brush 12 under skirts 14 to control air flow around brush 12. The skirts 14 largely contain within the brush chamber any dust stirred up by the brush 12. To complete the dust control there is a suction blower or vacuum fan 16 which exhausts air from the brush chamber to atmosphere in an airflow path shown by the arrows in FIG. 1. Vacuum fan 16 is housed within filter box 18 and includes an impeller which is driven by the machine's hydraulic system. Vacuum fan 16 maintains a sub-atmospheric pressure within the brush chamber so that air is drawn in under the skirts rather than flowing out. Thus relatively little dust escapes from around skirts 14. During machine 10 operation, vacuum fan 16 draws debris and dust-entrained air through prefilter 17 and filter 19 contained within filter box 18 prior to exhaust. Prefilter 17 is located within debris hopper 13 and is separated from filter box 18 during, for example, a debris hopper 13 lift and dump operation. Shaker mechanism 40 is provided on filter box 18. Periodic activation of shaker mechanism shakes filter 19 to dislodge dust and debris. Various components of machine 10 have been left out of FIG. 1, e.g., the drive engine, housings and operator station have been omitted to improve understanding of the aspects of the present invention. Additional examples of surface maintenance machine suitable for adaptation in accordance with the present invention are found in U.S. Pat. Nos. 5,254,146 and 5,303,448, each patent being incorporated by reference herein for all purposes.

Figure 2:
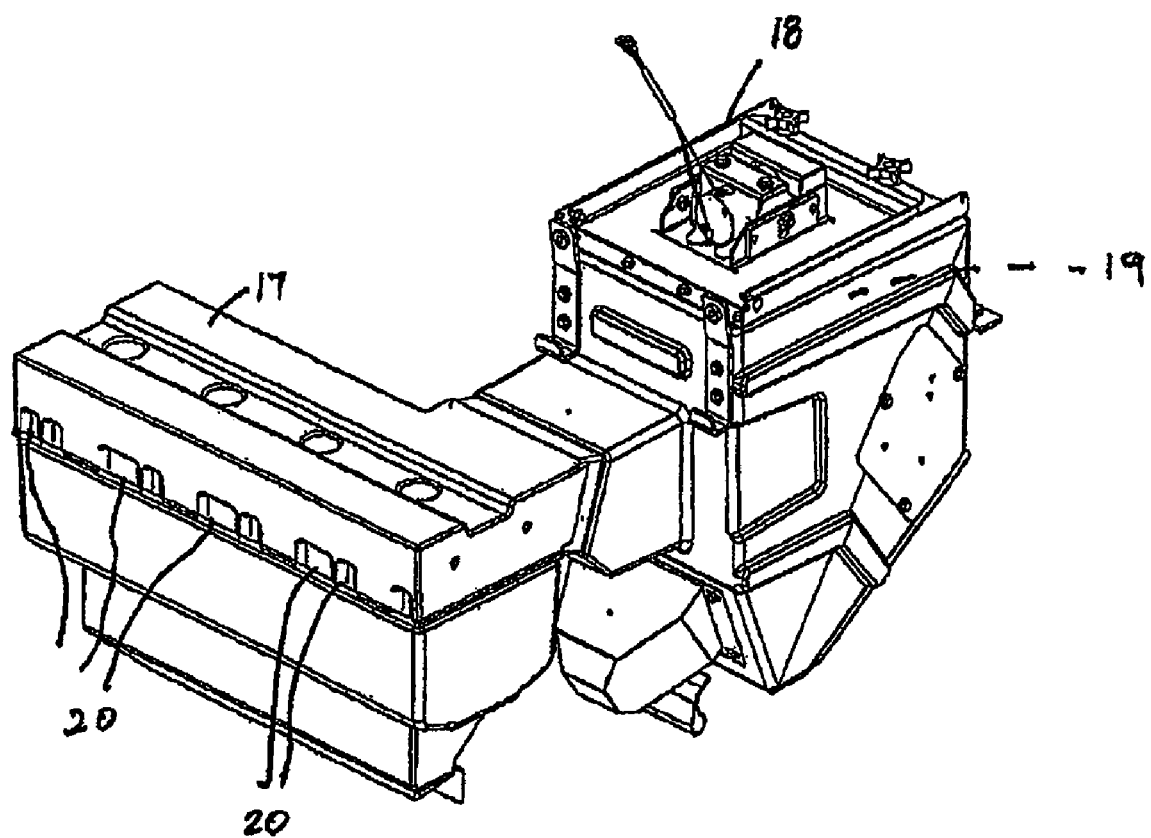
FIGS. 2 and 3 are perspective illustrations of the prefilter chamber and filter box of the cleaning machine of FIG. 1.

FIG. 2 is a perspective view of prefilter 17 and filter box 18. Filter box 18 houses cylindrical filter 19 as described in more detail hereinafter. Dust and debris-laden air is drawn by vacuum action into prefilter openings 20. Together the prefilter 17 and filter box 18 remove dust and/or debris from the air stream so the vacuum fan 16 will exhaust relatively clean air to atmosphere during machine 10 operation. Prefilter 17 may comprise a bank of cyclonic filters through which dusty air passes causing separation and retention of at least some of the larger dust particles and debris.

In a preferred embodiment, filter box 18 includes a cylindrical pleated media filter 19, such as are manufactured, for example, by Donaldson Company, Inc. of Minneapolis, Minn. Filter 19 has a pleated media, with the pleats running parallel to the centerline of the cylinder, which makes them vertical when installed as shown. The pleated media is surrounded with a perforated metal sleeve for structural integrity. Outside the metal sleeve may be provided a fine mesh sleeve (not shown) woven from a slippery synthetic filament which stops the coarser dust and sheds it easily during a filter cleaning cycle. The ends of the cylindrical filter are open. Other filter technologies could be utilized in alternative embodiments of filter box 18.

A preferred example of the invention utilizes a cylindrical pleated media filter. However, the invention will accommodate air filters of other types. An alternative design includes two or more flat panel pleated media filters, and other known types of air filters may also be successfully employed. These might include, for example, cloth filters formed into bags, envelopes or socks, which are well known types of filters in the field of air filtration.

Figure 3:
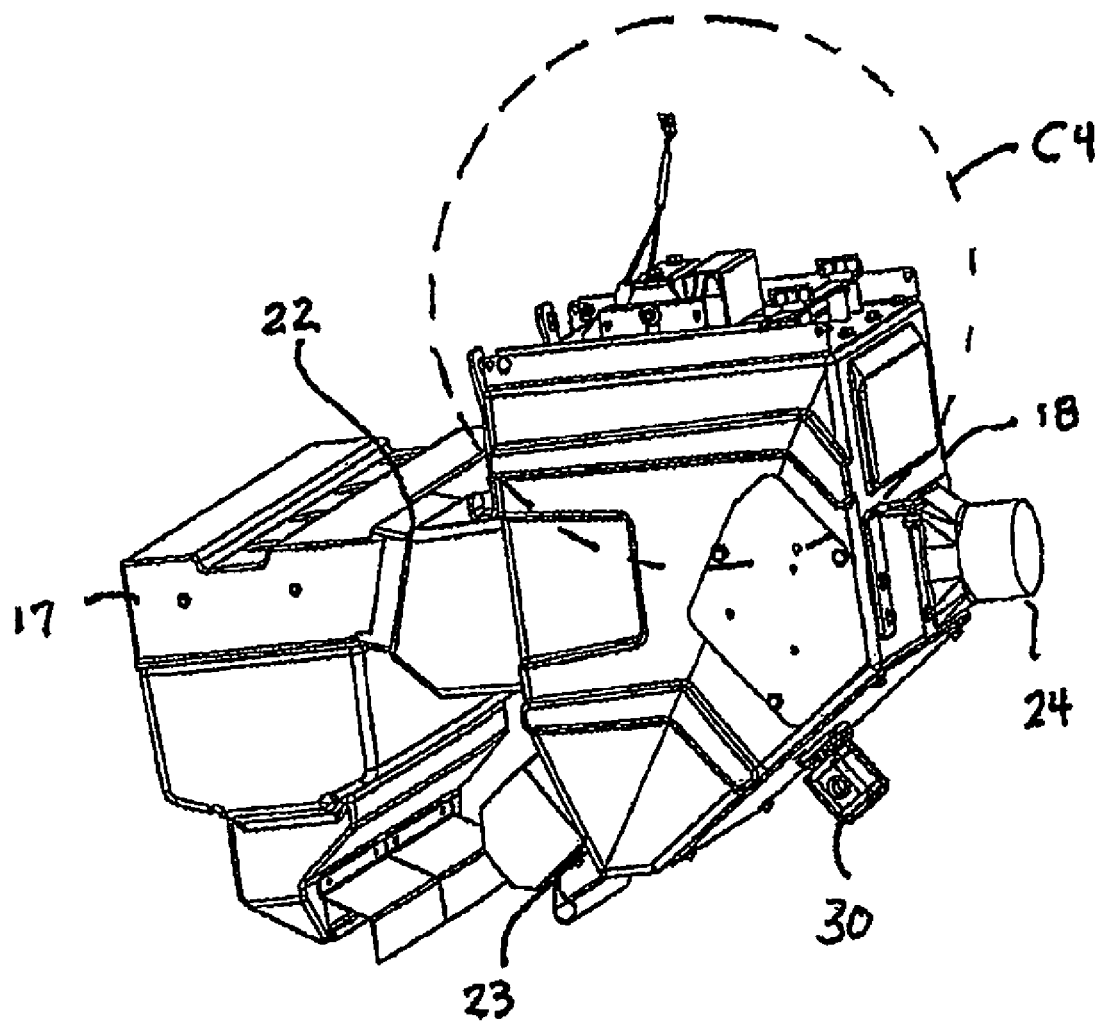

As shown in FIG. 3, filter box 18 has an intake opening 22 at the front of the machine 10 to admit air from the prefilter assembly 17. As illustrated a flexible coupling, such as foam, is utilized to provide fluid communication between prefilter 17 and filter box 18. Dust and debris captured by filter box 18 is removable via a lower debris outlet port 23. Filter air is directed out of filter box 18 at air outlet 24. Upon deactivation of the vacuum system, an accumulation of dust and debris passes through a seal at debris outlet port 23 and into the machine hopper 13 (not shown). During machine 10 operation, this the debris outlet port seal is kept closed by vacuum action. Filter box 18 includes vacuum fan motor 30 which is coupled to the vacuum impeller (not shown).

Figure 4:
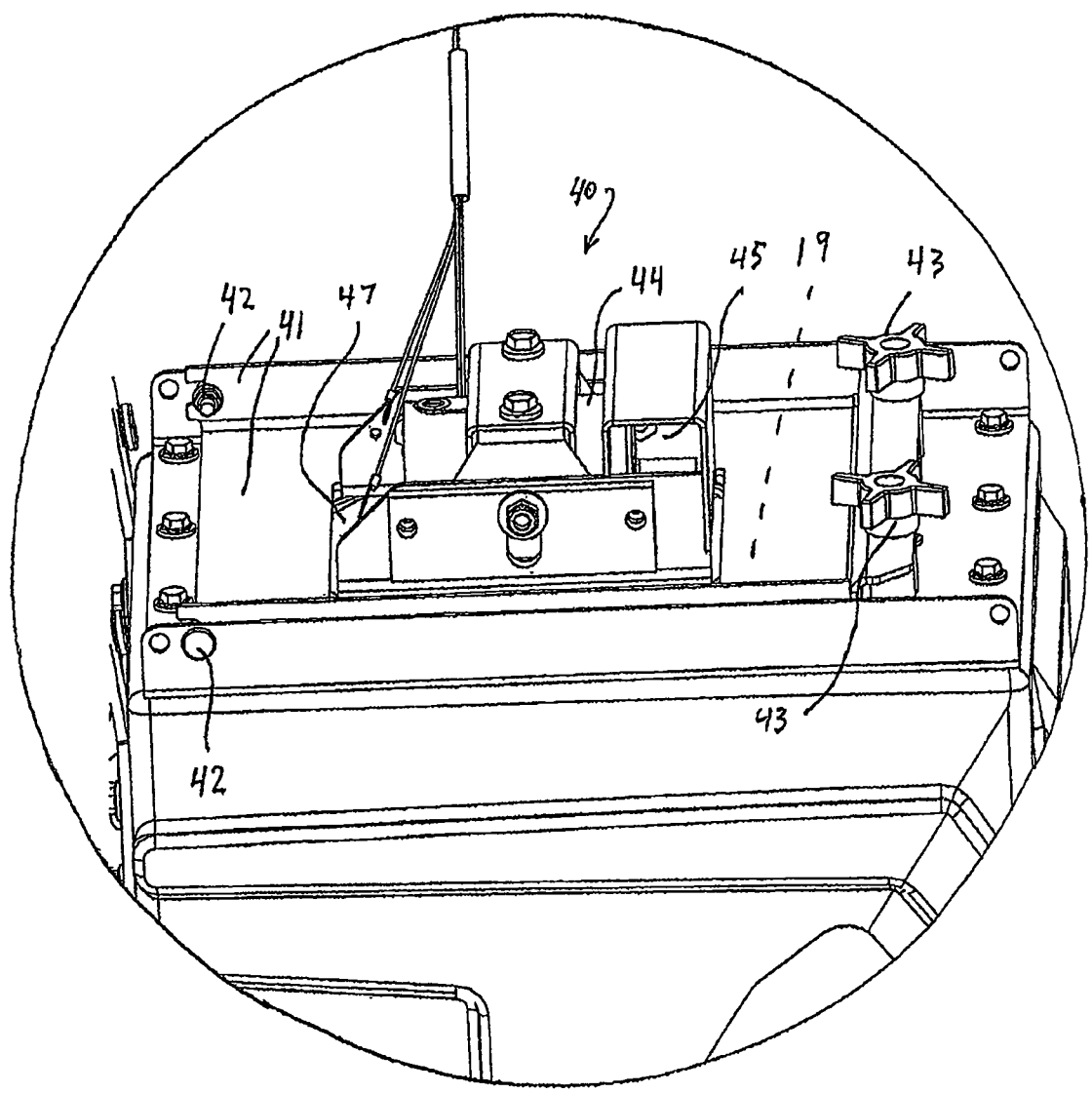
FIG. 4 is an enlarged portion of FIG. 3 contained within circle C4.

FIG. 4 is an enlarged portion of the filter box 18 showing details of shaker mechanism 40 as indicated by circle, C4, in FIG. 3. A hinged cover plate 41 is secured on top of filter box 18 by two hinge assemblies 42 and two clamp assemblies 43. When clamp assemblies 43 are released, cover plate 41 and connected components rotate about the hinges 42 to allow access into filter box 18. Cover plate 41 has a large generally rectangular opening in it corresponding to the general location of the cylindrical filter 19.

Shaker mechanism 40 includes an electric motor 44 coupled to an eccentric mass 45. Electric motor 44 is coupled to a shaker plate 47 which engages the top of filter 19. Shaker mechanism 40 also includes a vibration-isolating motor mount assembly which permits shaker plate 47 to vibrate generally independently relative to cover plate 41 during a filter shaking procedure.

Figure 5:
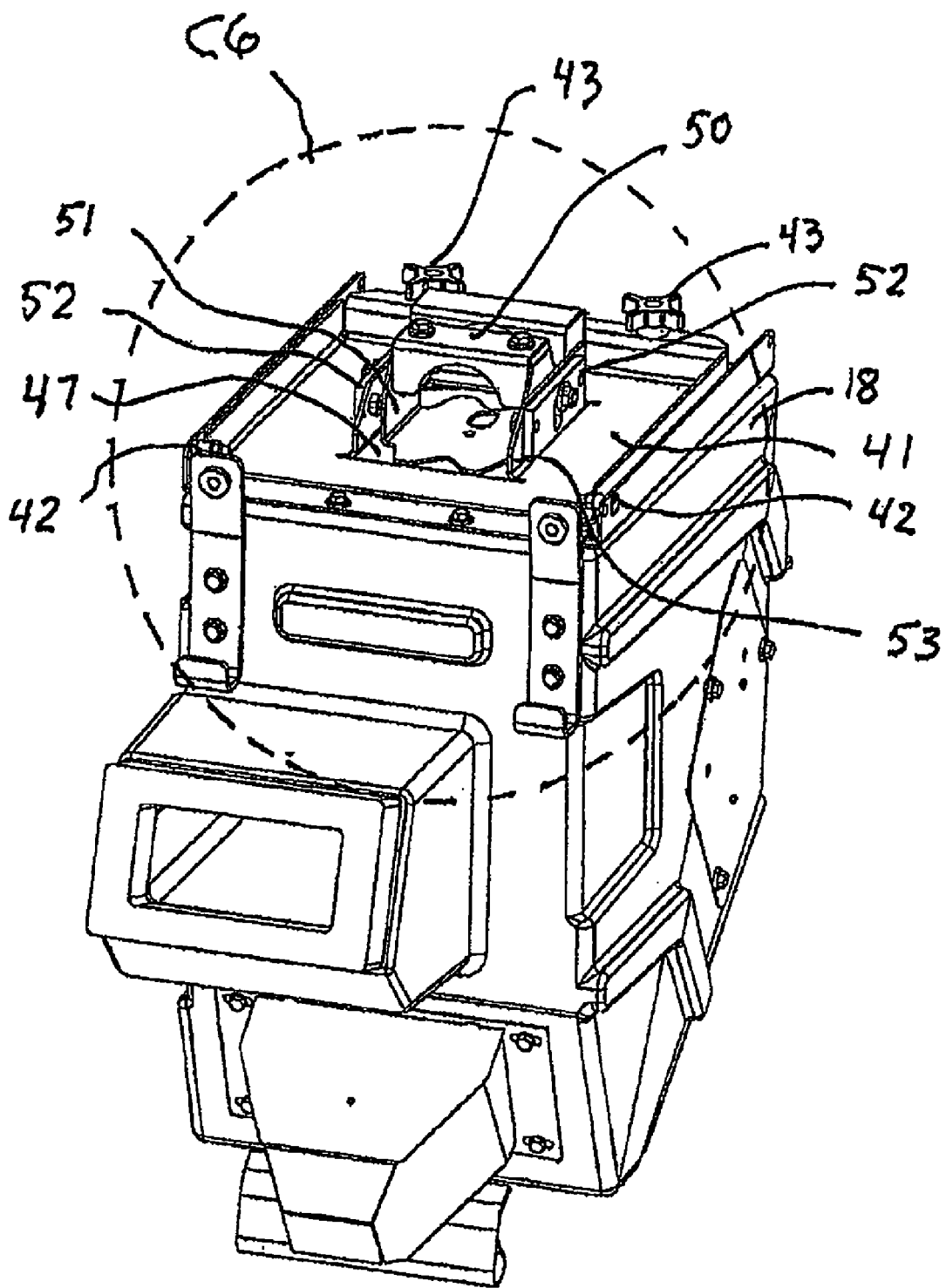
FIG. 5 is a perspective illustration of the prefilter chamber and filter box of FIG. 1.
Figure 6:
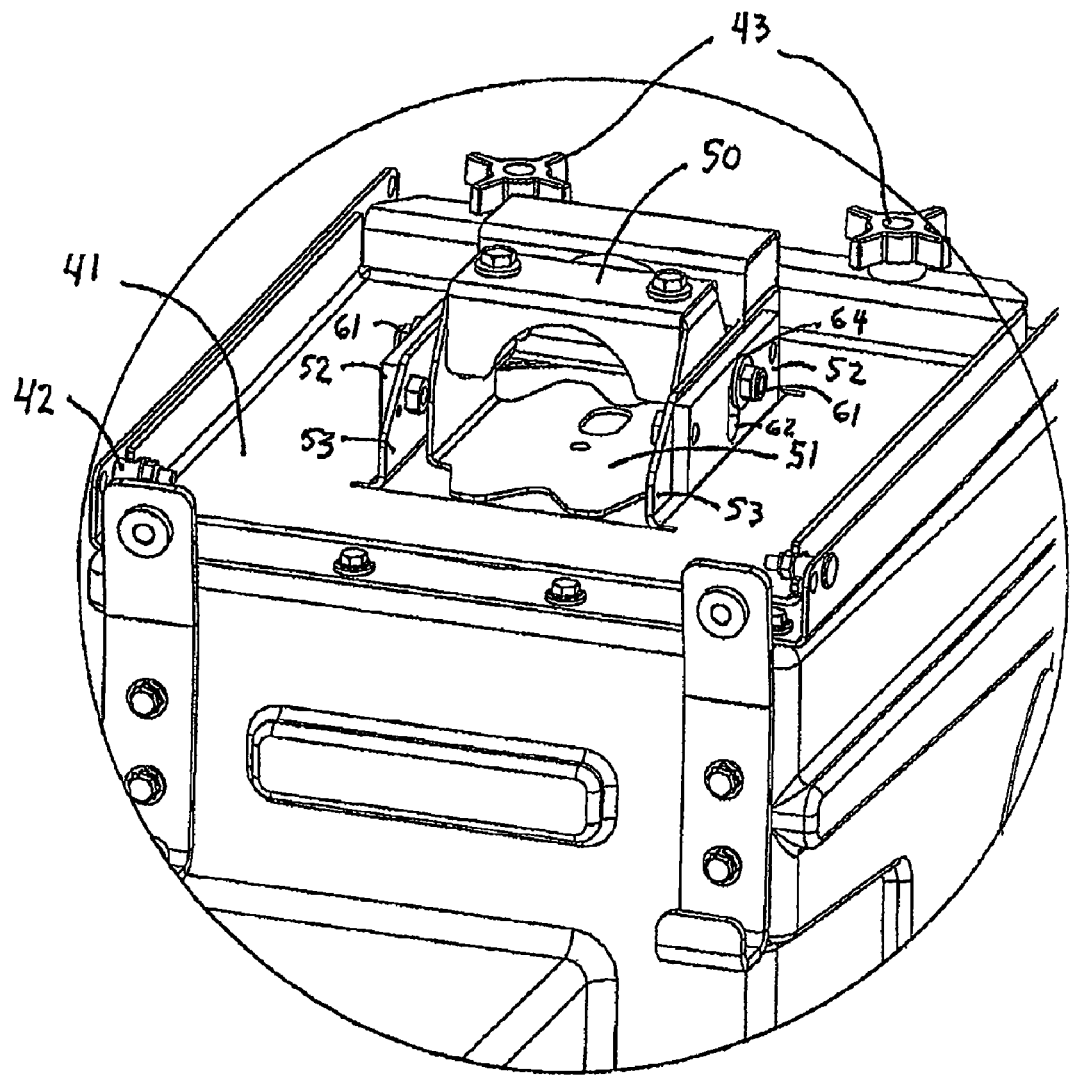
FIG. 6 is an enlarged portion of FIG. 5 contained within circle C6.

Referring to FIG. 5, the motor mount assembly includes a motor clamp 50, motor saddle 51, and a pair of slide plates 52 secured to upwardly directed flanges 53 of hinged cover plate 41. Electric motor 44 and eccentric mass 45 have been removed in this illustration. FIG. 6 is an enlarged portion of the filter box 18 assembly showing details of shaker mechanism 40 as indicated by circle, C6, in FIG. 5.

Motor 44 is secured between motor clamp 50 and saddle 51. Saddle 51 is rigidly coupled to shaker plate 47. Saddle 51 is movably coupled to slide plates 52 via a pair of fasteners 61. In this example, fasteners 61 are free to move within slots 62 to permit a generally vertical displacement of the saddle 51, clamp 50, motor 44 and eccentric mass 45 during a filter shaking procedure. Washers 64 slide against slide plates 52 as limited by slots 62.

Figure 7:
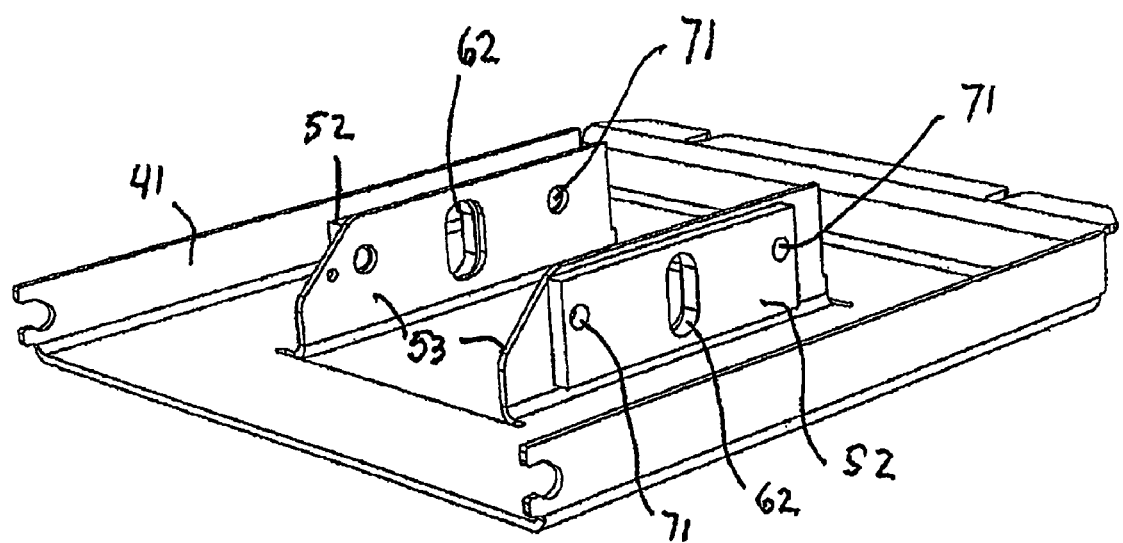
FIG. 7 is a perspective view of a cover component of the embodiment of FIG. 1.

FIG. 7 illustrates hinged filter cover plate 41 and slide plates 52. Fasteners (not shown) pass through openings 71 and secured slide plates 52 to flanges 53 of cover plate 41. Slots 62 extend through generally equally sized openings in slide plates 52 and flanges 53. In one example, slide plates 52 are of a durable material with substantially improved wear resistance relative to cover plate 41.

Figure 8:
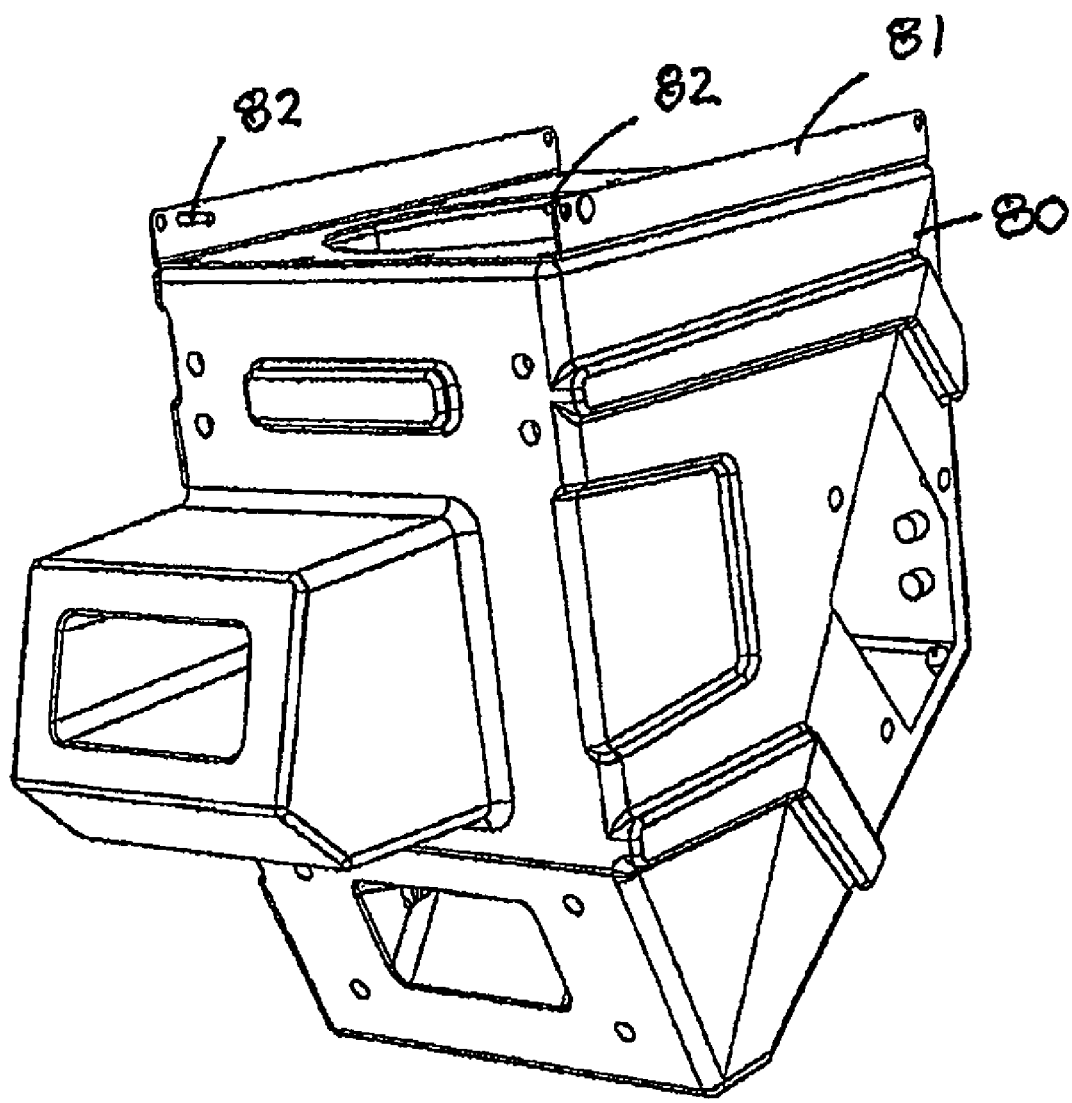
FIG. 8 is a perspective view of a housing of the embodiment of FIG. 1.

FIG. 8 illustrates housing 80 of filter box 18 and filter box cover 81. Cover 81 is secured to housing 80 in this example via threaded fasteners. Pin-shaped components 82 are included within hinge assemblies 42 and support cover plate 41 and connected components when cover plate 41 is opened, such as during a filter exchange.

Figure 9:
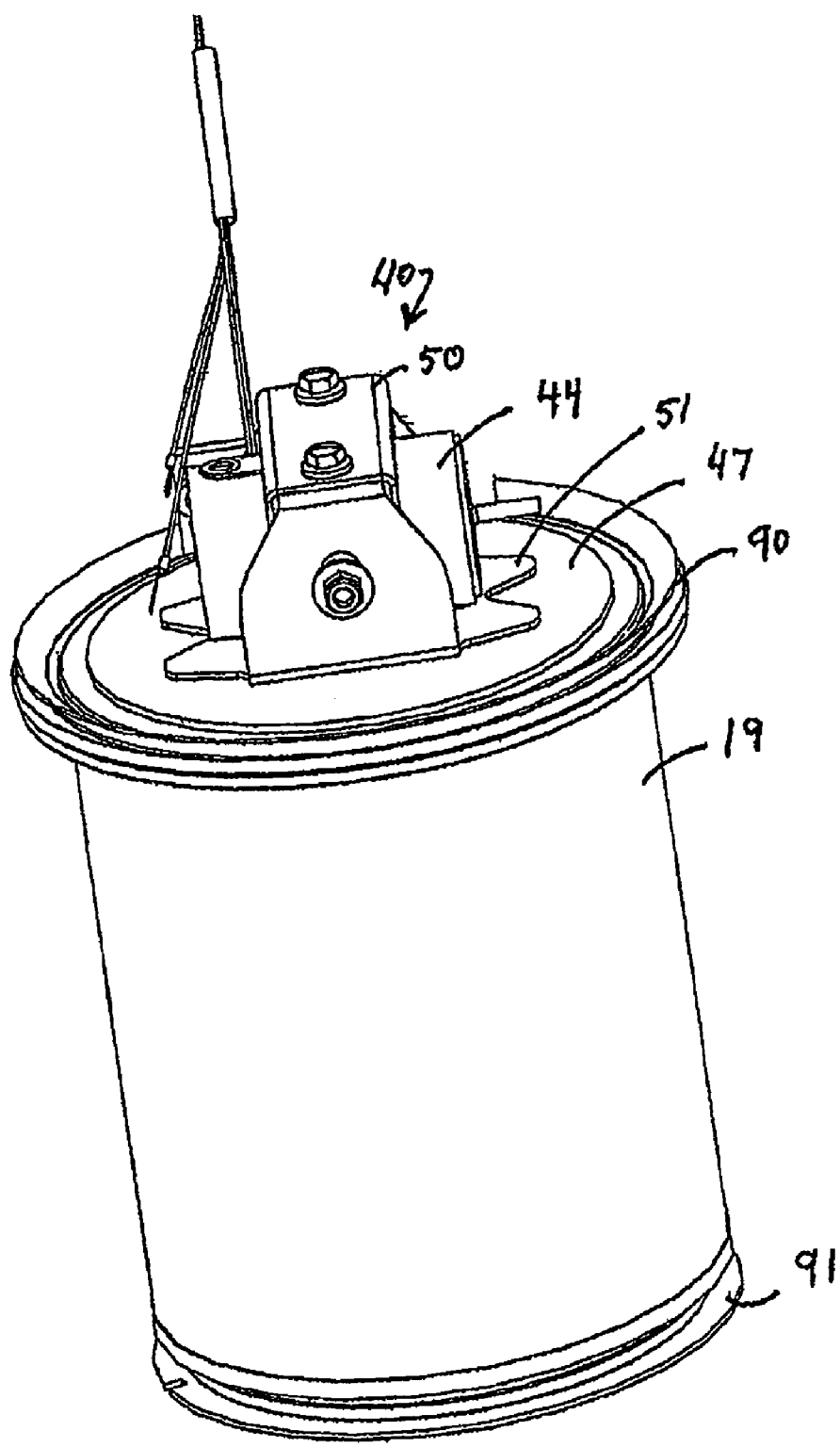
FIG. 9 is a perspective view of a filter and filter shaker mechanism of FIG. 1.

FIG. 9 illustrates components of shaker mechanism 40 and filter 19. In this example, shaker plate 47 is in generally direct contact with one end of filter 19. The opposite end of filter 19 is supported by a base within housing 80 (not shown). Upper annular seal 90 and lower annular seal 91 control air flow through top openings of filter 19.

Figure 10:
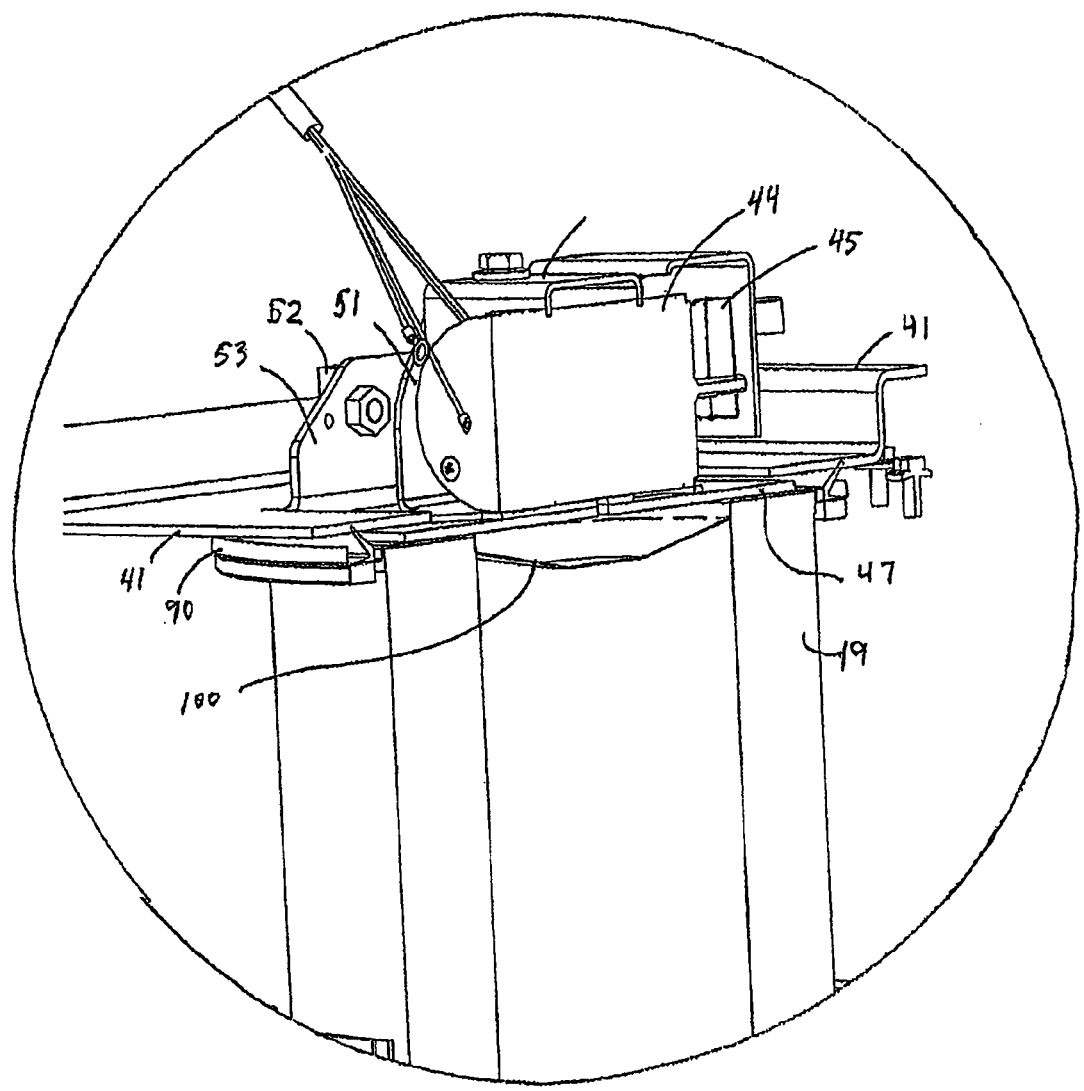
FIG. 10 is a cross sectional view of portions of FIG. 9.

FIG. 10 illustrates a cross sectional view of the shaker mechanism 40 and filter 19 of FIG. 9 in an operational orientation. Top cover 100 is held between a top surface of filter 19 and is in direct contact with shaker plate 47. Upper annular seal 90 is in contact with a lower surface of hinged cover plate 41. Forces generated during rotation of motor 44 and eccentric mass 45 are directly applied to the top of filter 19 and cause filter 19 to shake and dislodge dust and debris on filter 19 surfaces.

Figure 11:
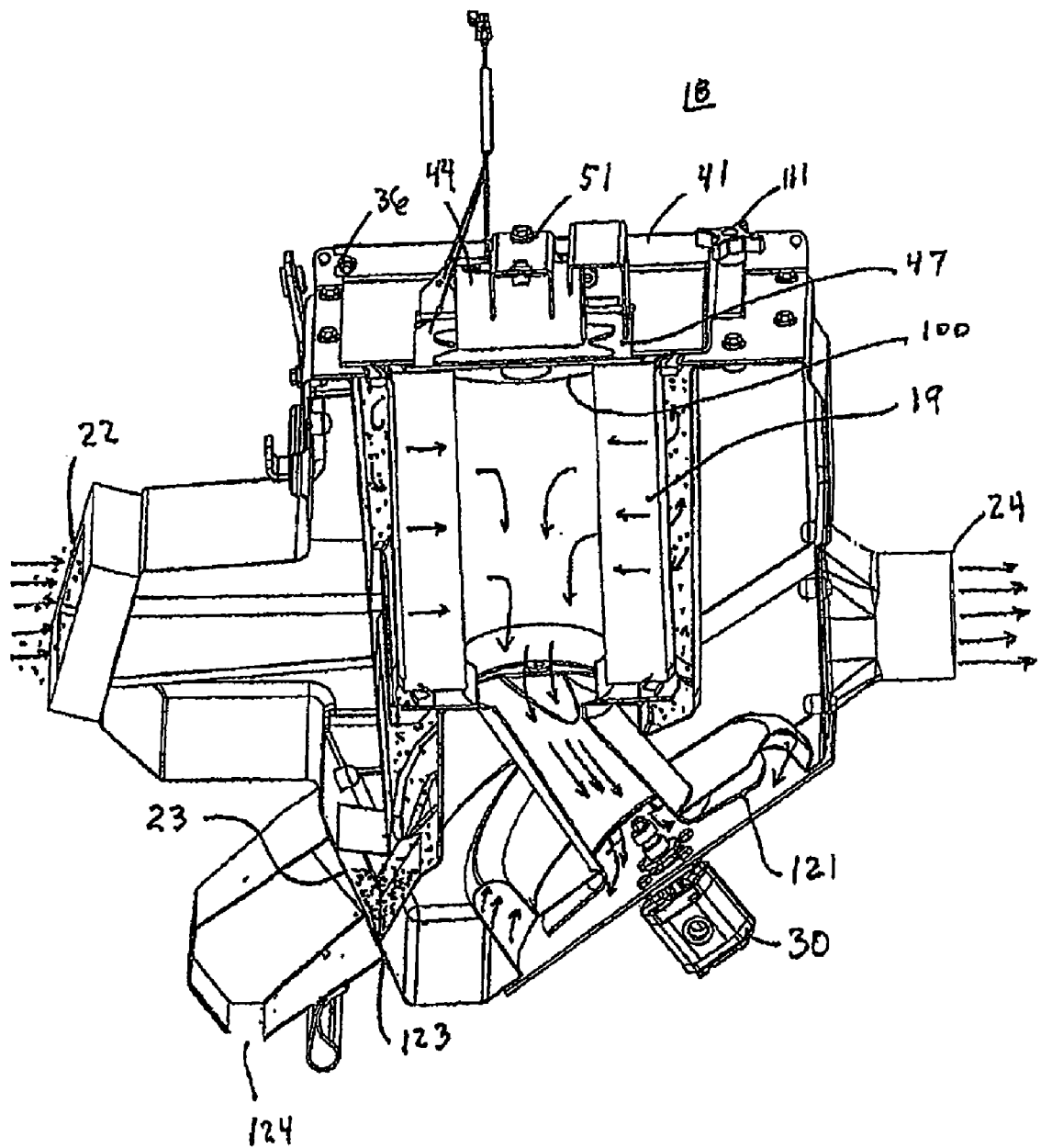
FIG. 11 is a depiction of components of FIG. 1 during operation.

FIG. 11 is a cross-sectional operational depiction of filter box 18 with airflows generally indicated by arrows. In operation, dusty airflow passes first through prefilter 17 and enters filter box 19 at intake opening 22. Air is drawn through filter box 18 upon activation of impeller 121 which is driven by vacuum fan motor 30 and exhausted toward the rear of the machine at air outlet 24. This is a preferred arrangement because the air is cleaned before it passes through the vacuum impeller, which reduces abrasive wear on the impeller. However, some sweepers pass the air first through the blower and then through the filters. This arrangement can also be accommodated by the invention.

During machine 10 operation, dust and debris accumulates near debris outlet 23. Seal 123 is held closed by vacuum action during machine 10 use. In the absence of impeller 121 rotation, debris forces open seal 123 and falls out of hopper box 18 through opening 124. In one example, opening 124 is located near an end of extension conduit 125 which is at least partially located within front hopper 13 of machine 10. Dust and debris falling out of filter box 18 is directed through extension 125 and drops through opening 124 onto a surface of hopper 13.

During a filter shaking procedure, the motor driven eccentric mass 45 imparts a vibratory motion to filter 19 to dislodge an accumulation of dust and debris. Various means for initiating a cleaning cycle can be envisioned. In one preferred embodiment, shaker motor 44 is activated after each time the vacuum system is turned off. In another embodiment, shaker motor 44 is controlled via a machine controller in response to differential pressure changes across filter 19. A pressure switch for sub-atmospheric pressure may also be installed at filter box 18, with one of its pressure ports connected to the duct leading to the exhaust fan and its other pressure port open to atmosphere. In normal service, as dust gradually accumulates on the filters, the differential pressure will rise. When it reaches a predetermined value the pressure switch will signal a controller to initiate an automatic filter cleaning cycle.

Details of operation of filter box 18 and prefilter 17 may be found in copending applications U.S. Ser. No. 12/043,945 entitled "External Filter Chamber", U.S. Ser. No. 12/045,948 entitled "Integral Vacuum Fan Housing", and U.S. Ser. No. 12/043,932 entitled "Filter Cleaning Apparatus", each document being incorporated by reference herein for all purposes.

During machine 10 operation, dust and debris accumulates near debris outlet 23. Seal 123 is held closed by vacuum action during machine 10 use. In the absence of impeller 121 rotation, debris forces open seal 123 and falls out of hopper box 18 through opening 124. In one example, opening 124 is located near an end of extension conduit 125 which is at least partially located within front hopper 13 of machine 10. Dust and debris falling out of filter box 18 is directed through extension 125 and drops through opening 124 onto a surface of hopper 13.

During a filter shaking procedure, the motor driven eccentric mass 45 imparts a vibratory motion to filter 19 to dislodge an accumulation of dust and debris. Various means for initiating a cleaning cycle can be envisioned. In one preferred embodiment, shaker motor 44 is activated after each time the vacuum system is turned off. In another embodiment, shaker motor 44 is controlled via a machine controller in response to differential pressure changes across filter 19. A pressure switch for sub-atmospheric pressure may also be installed at filter box 18, with one of its pressure ports connected to the duct leading to the exhaust fan and its other pressure port open to atmosphere. In normal service, as dust gradually accumulates on the filters, the differential pressure will rise. When it reaches a predetermined value the pressure switch will signal a controller to initiate an automatic filter cleaning cycle.

Figure 12:
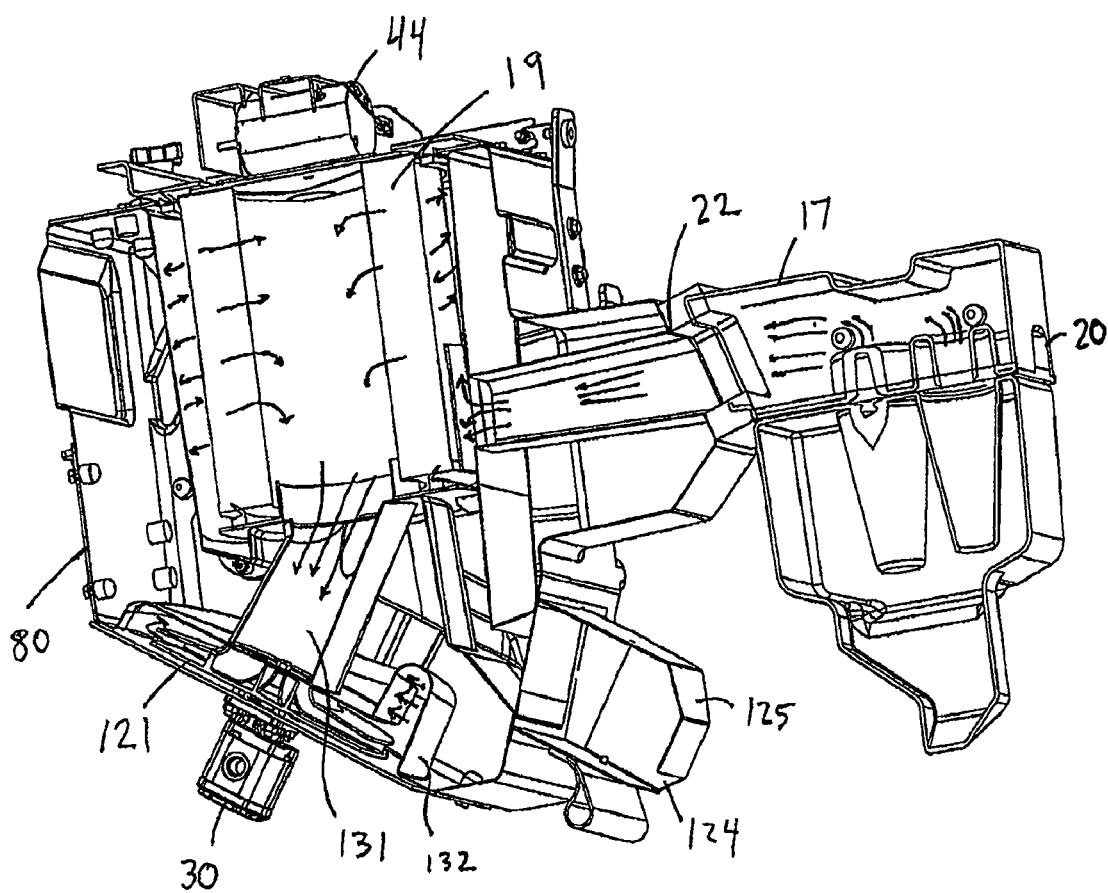
FIGS. 12 and 13 are depictions of a filter box and prefilter during machine operation.
Figure 13:
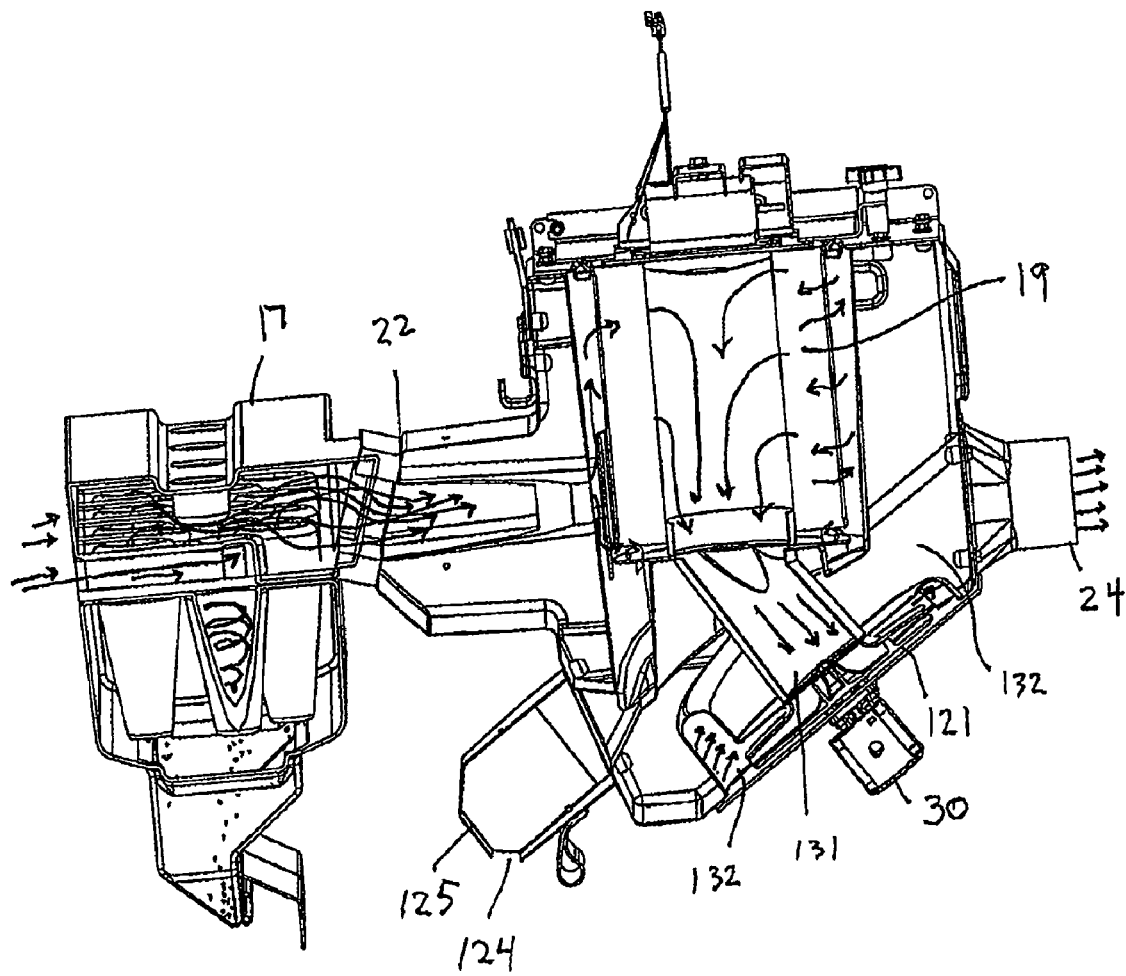

FIGS. 12 and 3 are cross-sectional operational depictions of filter box 18 and prefilter 17 showing airflows generally indicated by arrows. In operation, dusty airflow passes first through prefilter 17 and enters filter box 19 at intake opening 22. Air is drawn through filter box 18 upon activation of impeller 121 which is driven by vacuum fan motor 30 and exhausted toward the rear of the machine at air outlet 24. In addition to containing cylindrical filter 19, filter box 18 also defines a vacuum fan housing for drawing air through filter and conduit 131 and directing air out through conduit 132 which has an expanding cross section as conduit 132 travels from impeller 132 to outlet 24. In one example of the invention, filter box 18 is a rotationally molded polymer component.

Figure 14:
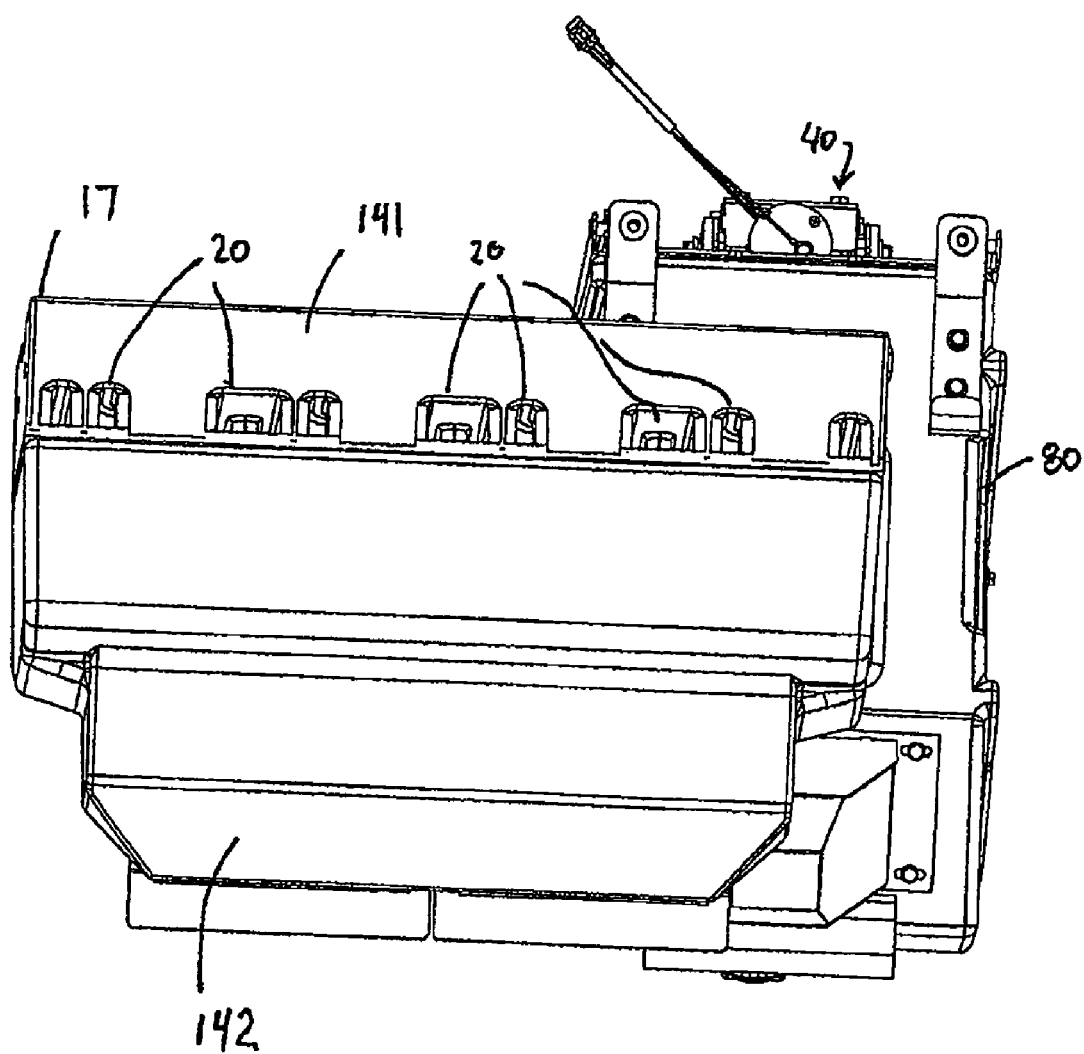
FIG. 14 is a perspective view of the prefilter and filter box of the machine FIG. 1.

FIG. 14 is a front perspective view prefilter 17 and filter box 18. Prefilter 17 includes a top housing 141 and a bottom portion housing. Air inlets 20 are defined along lower surfaces of upper housing 141.

Figure 15:
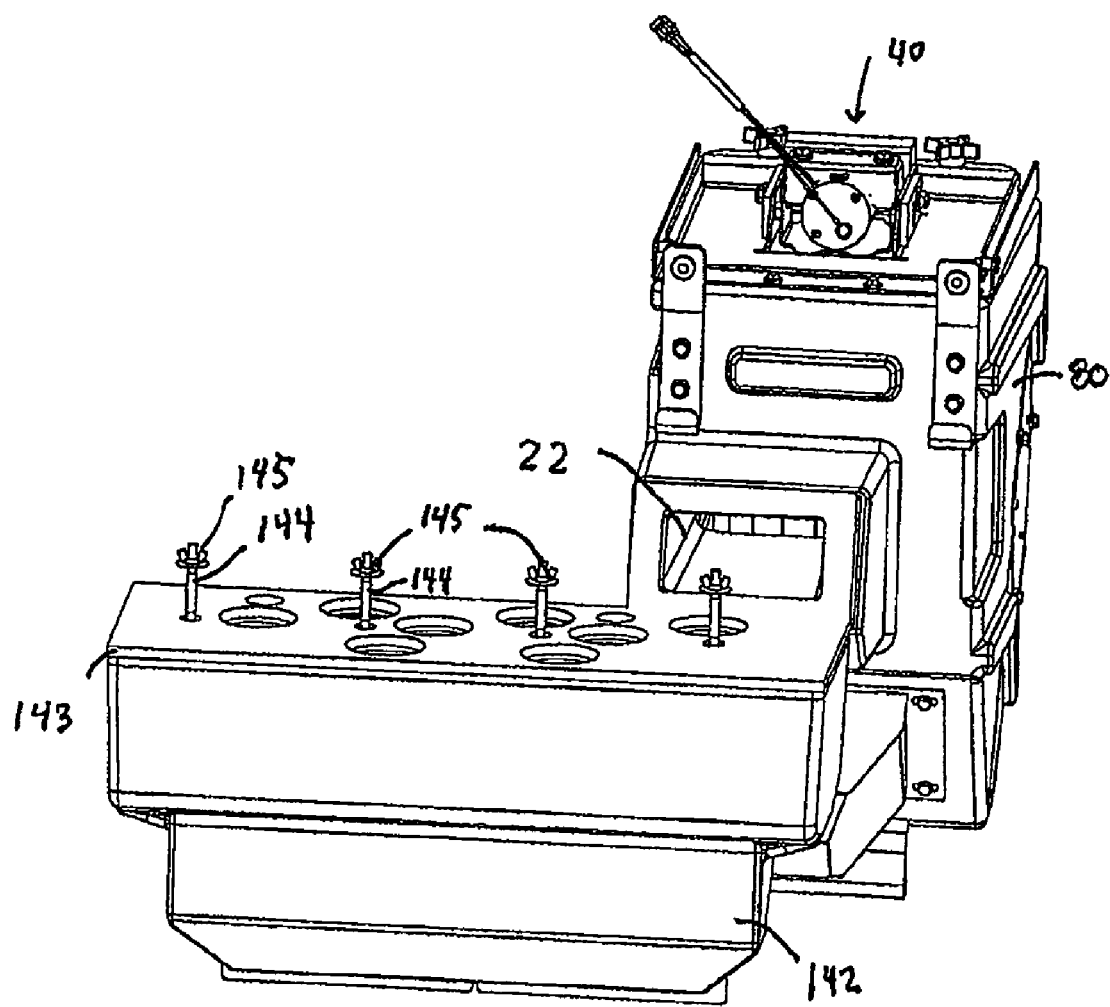
FIG. 15 is a perspective view of the prefilter and filter box of FIG. 14, with a portion of the prefilter removed.

FIG. 15 represent the assembly of FIG. 14 with top housing 141 removed. Seal 143 functions as a gasket to minimize air leakage at the junction between top and bottom housing 141, 142. Seal 143 includes a plurality of openings permit air to flow between the top and bottom housings 141, 142. In another example, seal 143 may have fewer openings thereby blocking air flow through one or more cyclone filter sections. Threaded stem 144 and nut 145 are used to secure the top housing 141 to the lower housing 142. Nuts 145 are shown as wing-nuts, though other threaded or non-threaded fasteners may be utilized in another example of the invention. Nuts 145 are accessible from above top housing 141 of prefilter 17, thereby allowing inspection of prefilter 17 interior without removing the lower housing 142.

Figure 16:
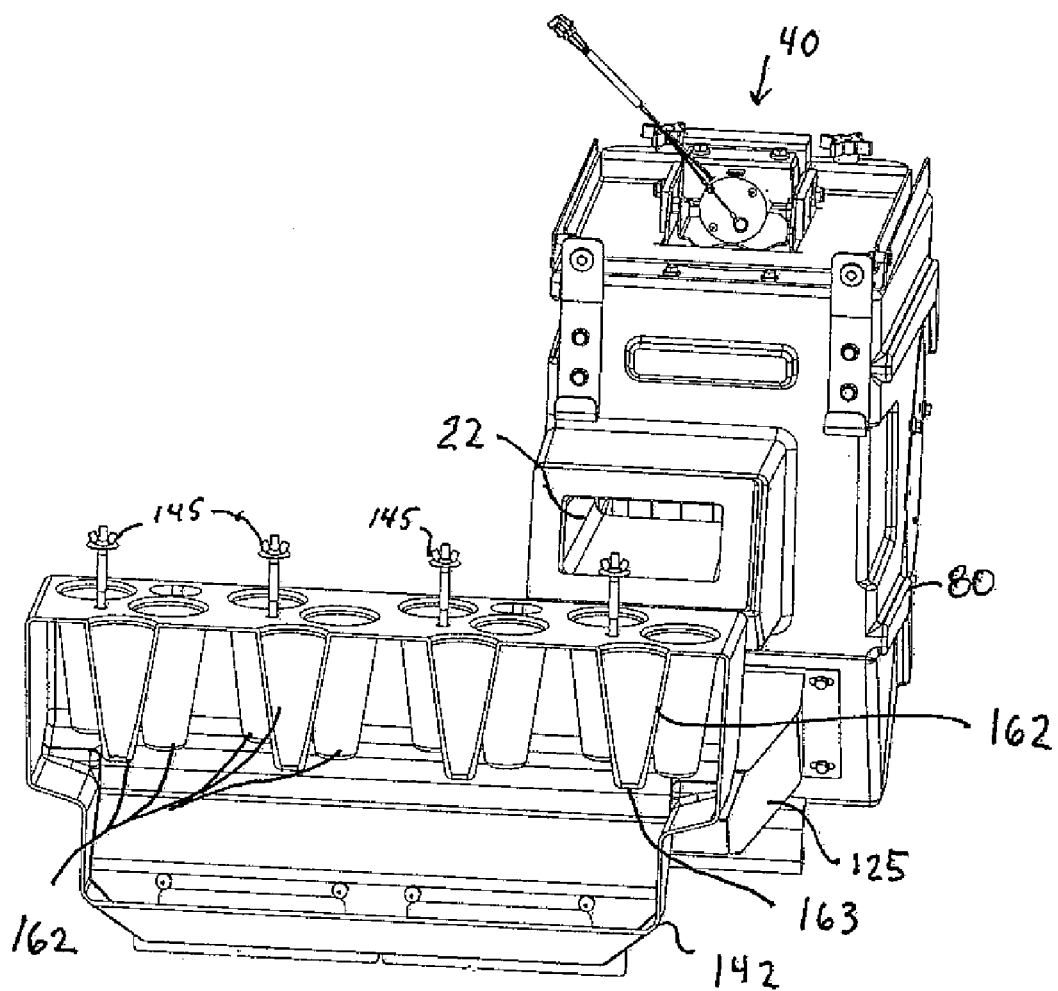
FIG. 16 is a cross sectional view of the prefilter and filter box of FIG. 15 taken through a lower prefilter housing.

FIG. 16 is a cross sectional view of prefilter 17. Cones 162 form a lower portion of a cyclone filter. In the illustrated example, cones 162 are integrally formed into lower housing 142. Each cone has a lower aperture 163 through which dust passes during machine operation. Dust collects on an inner surface of lower housing 142 until hopper 13 is cleared during a dumping procedure.

Figure 17:
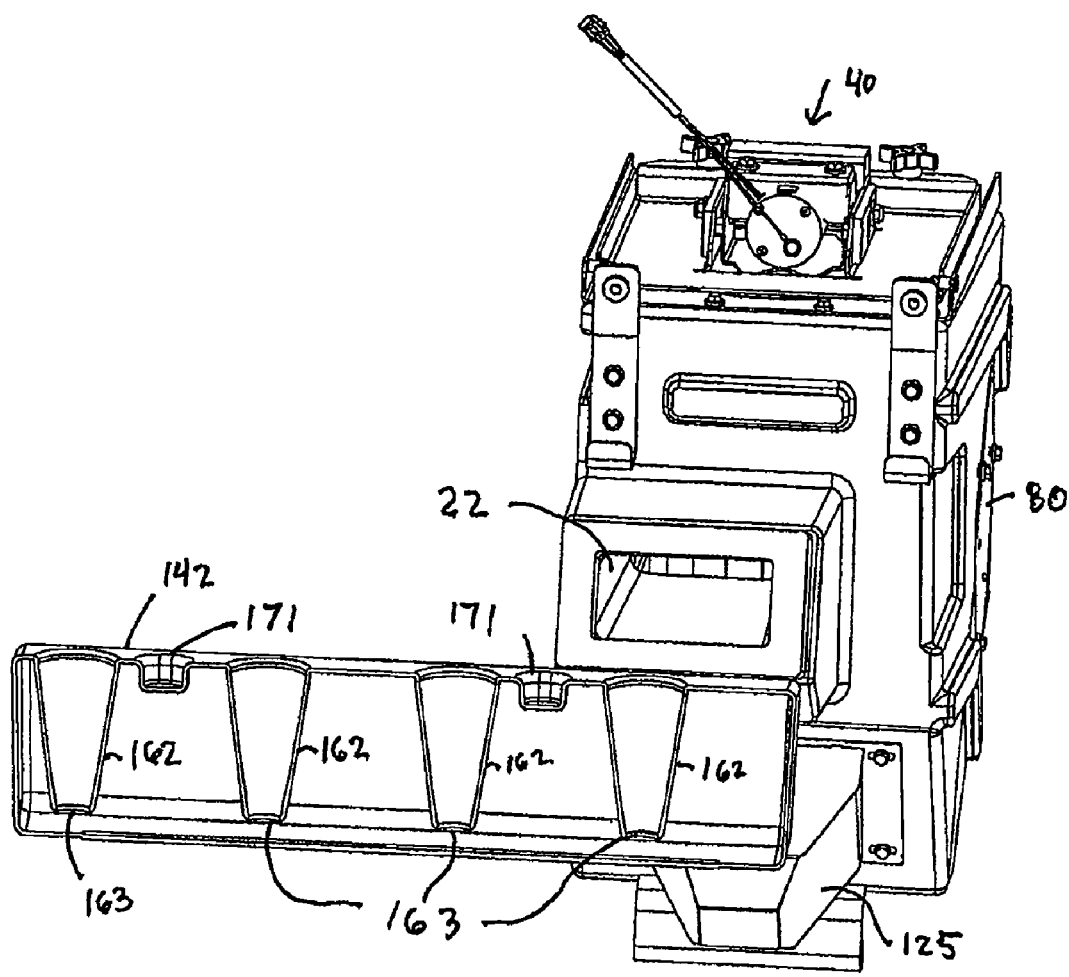
FIG. 17 is a cross sectional view of the prefilter and filter box of FIG. 15 taken through a lower prefilter housing.
Figure 18:
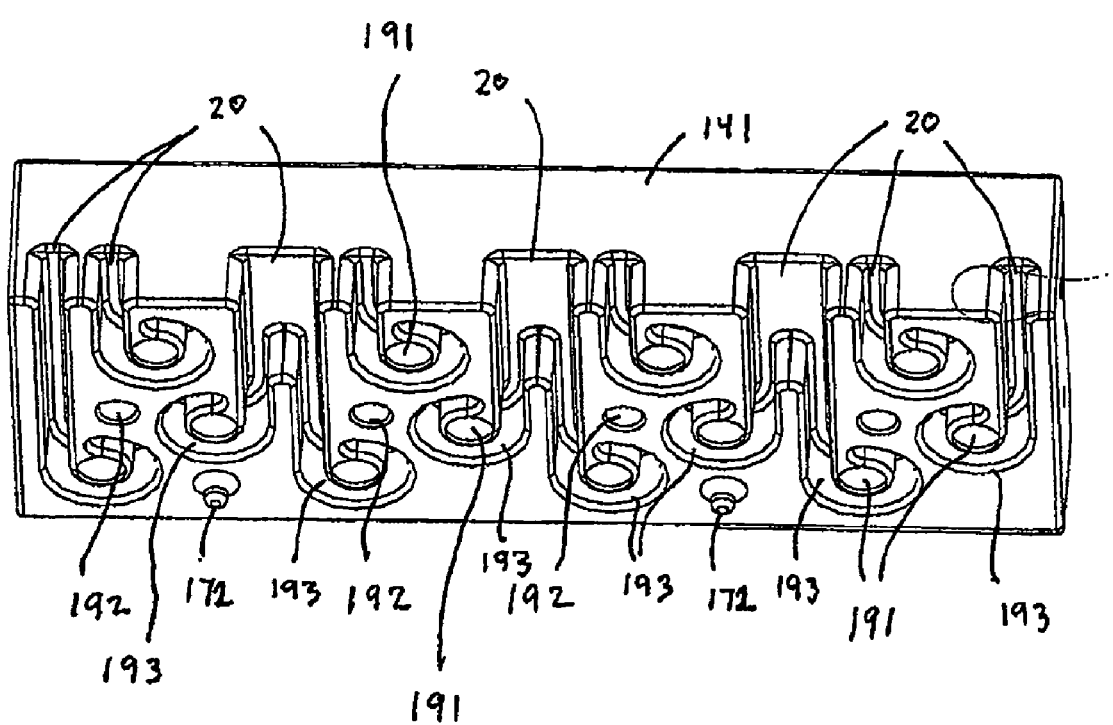
FIG. 18 is a perspective view of the upper housing of the prefilter of FIG. 14.

FIG. 17 is another cross sectional view of prefilter 17 taken closer to filter box 18 relative to FIG. 16. Lower housing 142 also includes cavities 171 which engage a pin formation on a lower surface of top housing 141. Referring to FIG. 18, pin formations 172 are sized to be received into cavities 171 thereby aligning the top and bottom housings 141, 142 during assembly or replacement after inspection.

As shown in FIG. 18, air inlets 20 are defined by guide walls 193 that extend into top housing 141 and spiral in one direction or the other. In the illustrated example, guide walls 193 define spirals extending in clockwise and counter-clockwise directions. Air and dust flowing into inlets 20 is conducted through channels defined by guide walls 193 with the spiral formations creating a rotational air flow at the top openings of cones 162. Dust and debris is separated from the airflow by a centrifugal effect and falls through openings 163. Filtered air flows through openings 191 and into the interior of top housing 141.

Figure 19:
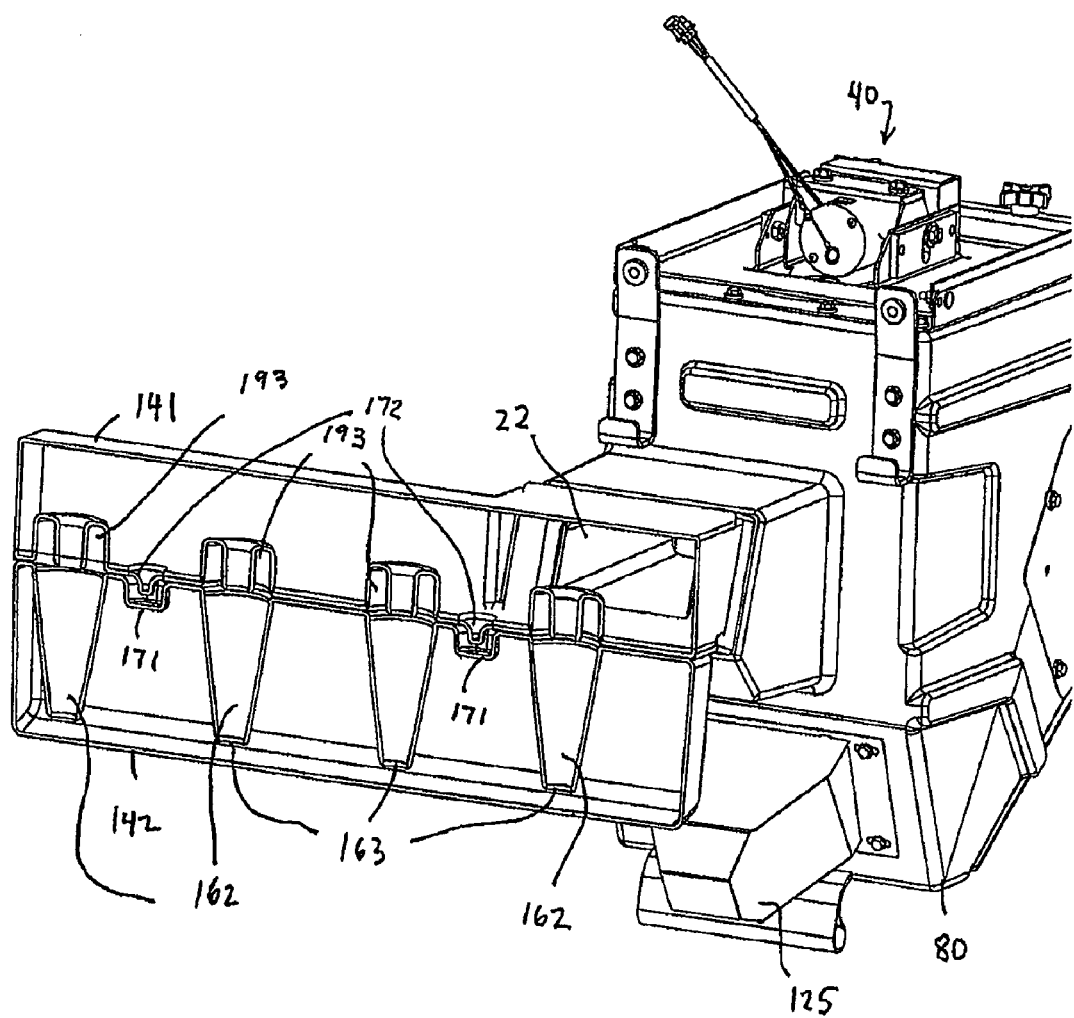
FIG. 19 is a cross sectional view of the prefilter and filter box of FIG. 14 taken through the prefilter housings.
Figure 20:
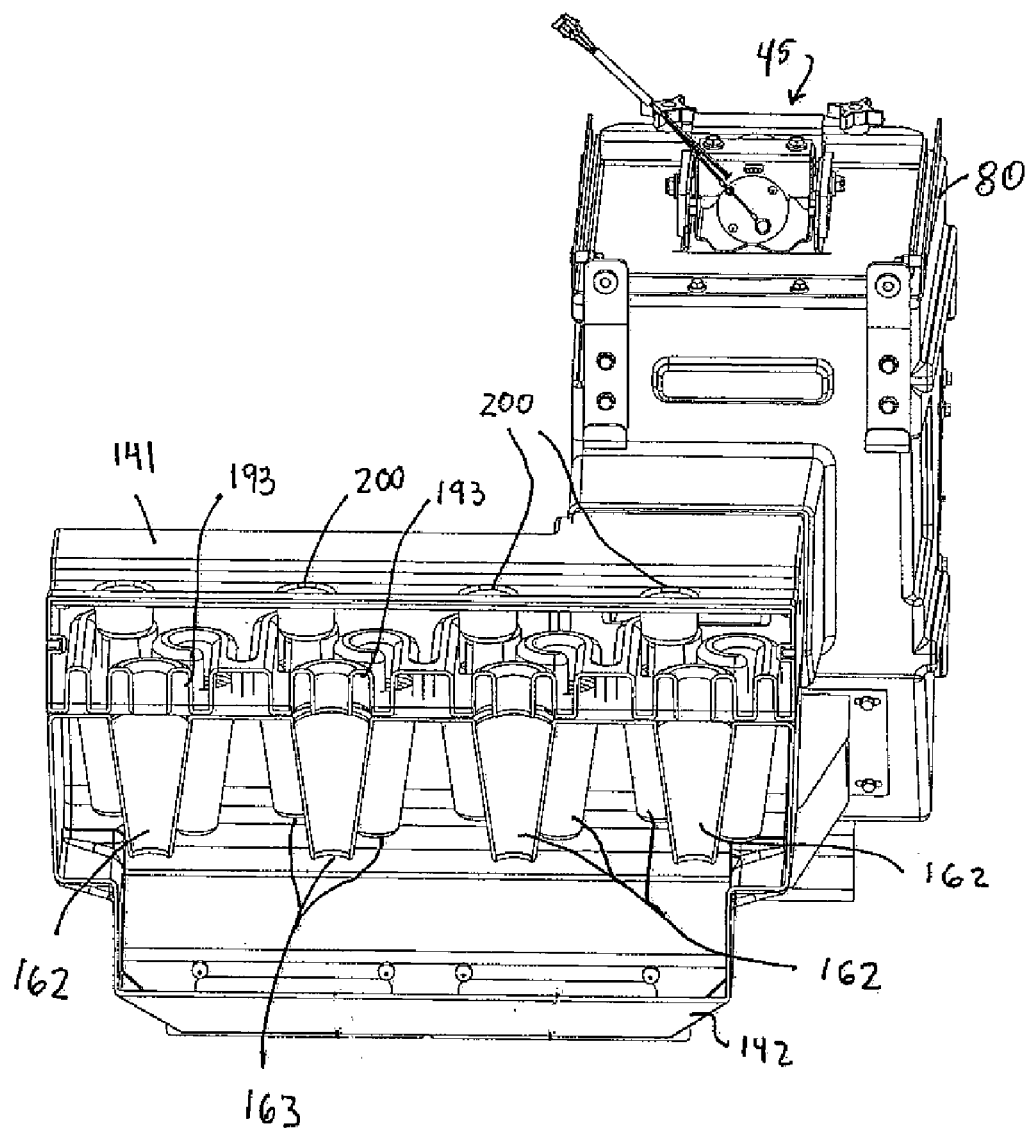
FIG. 20 is a cross sectional view of the prefilter and filter box of FIG. 14 taken through the prefilter housing.

FIG. 19 is a cross sectional view of prefilter 17 taken through a row of cones 162. Top housing 141 includes an opening allowing airflow into air inlet 22 of filter box 18. FIG. 20 is a cross sectional view of prefilter 17 taken through another row of cones 162. Openings 200 are defined upon top housing 141. As described hereinafter, fasteners 144, 145 pass through a cavity defined at its upper extent by opening 200.

Figure 21:
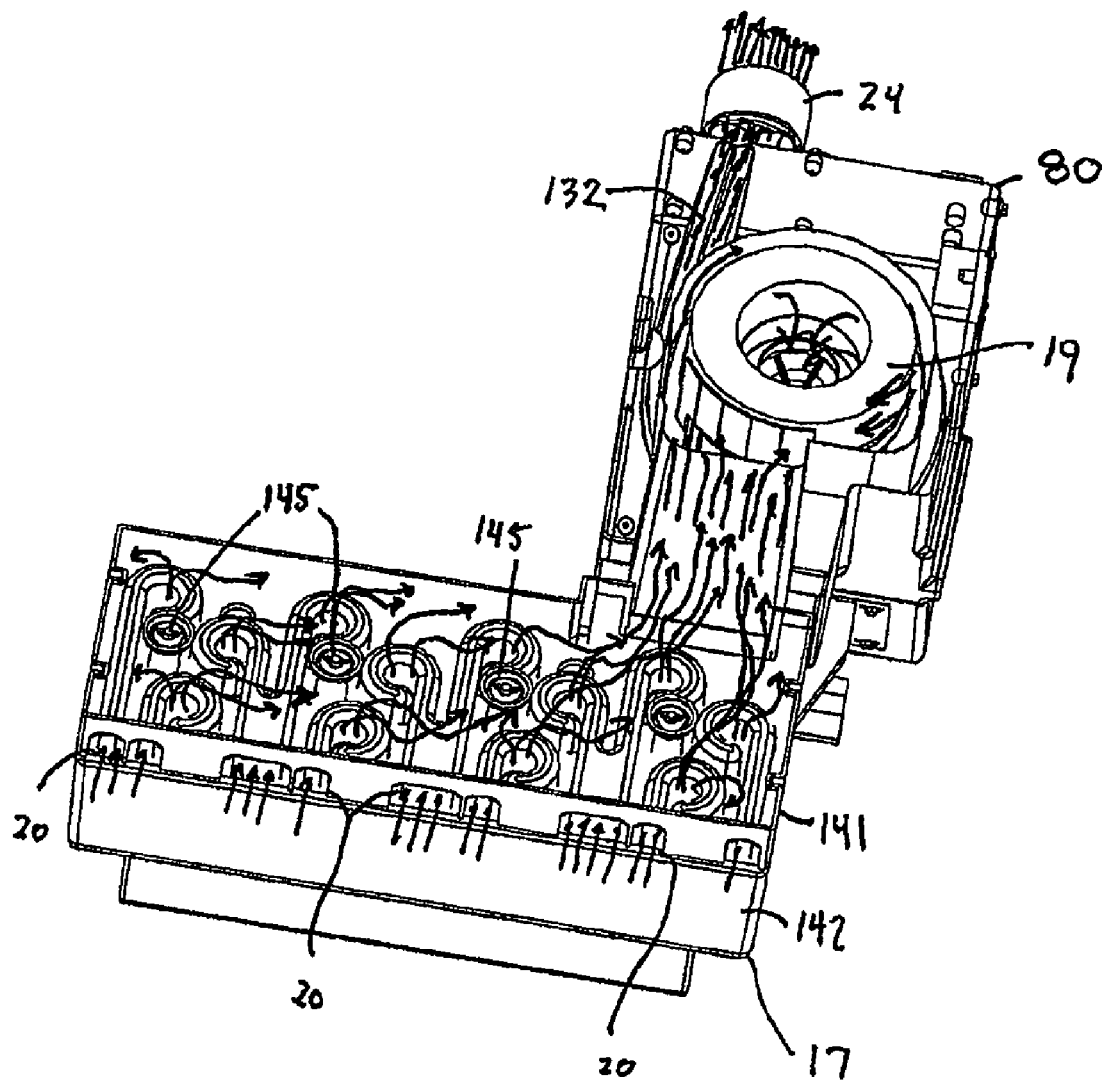
FIGS. 21-23 are depictional cross sectional views of the prefilter and filter box of FIG. 14 taken through the prefilter and filter box assembly.

FIG. 21 depicts an airflow through prefilter 17 and filter box 18, such as during machine 10 operation. Dusty air enters prefilter 17 at openings 20 and is conducted through spiral-formed portions of top housing 141, through the cyclone filter elements, and enters the interior of top housing 141. Partially filter air then flows through inlet 22 prior to being drawn through filter 19 by vacuum action.

Figure 22:
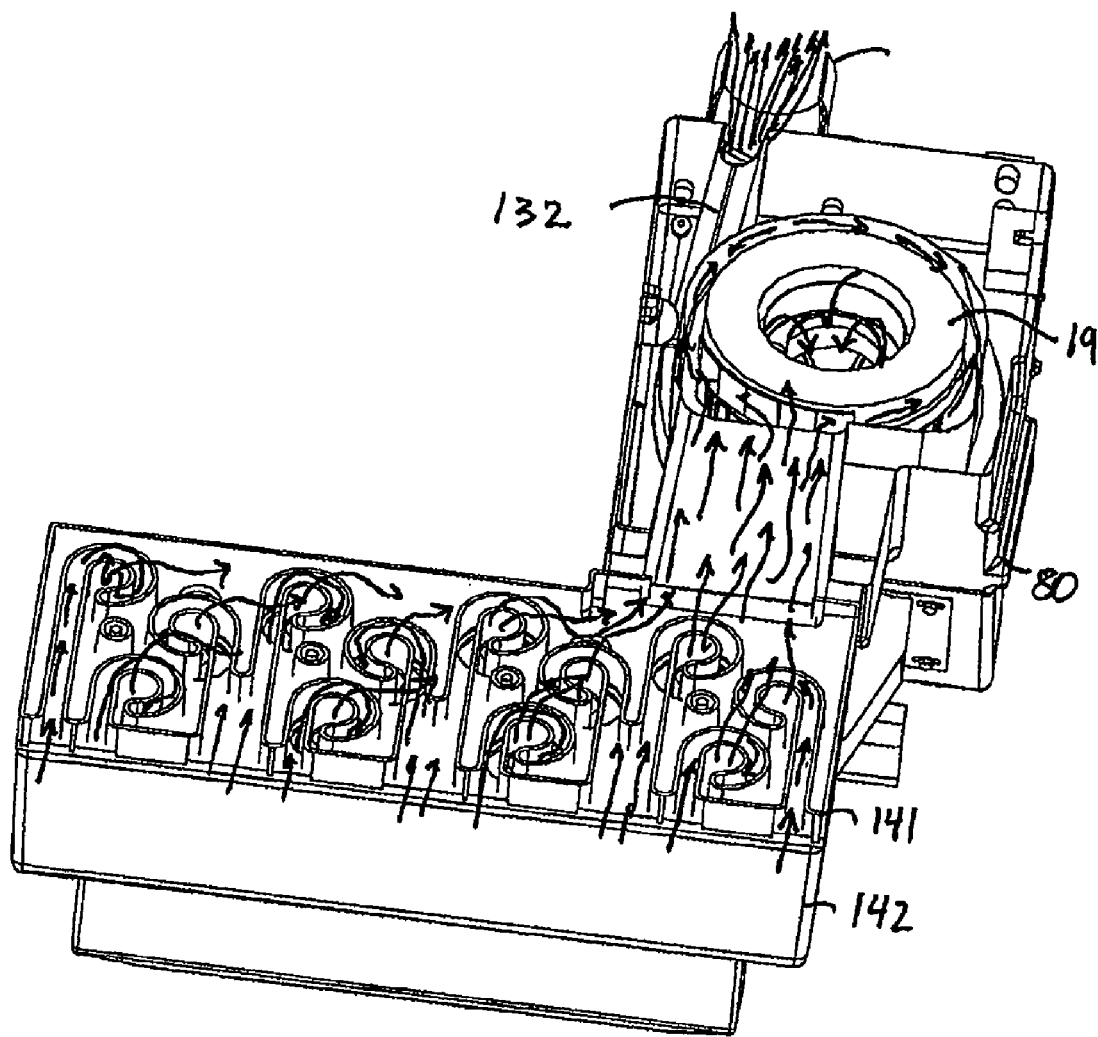
Figure 23:
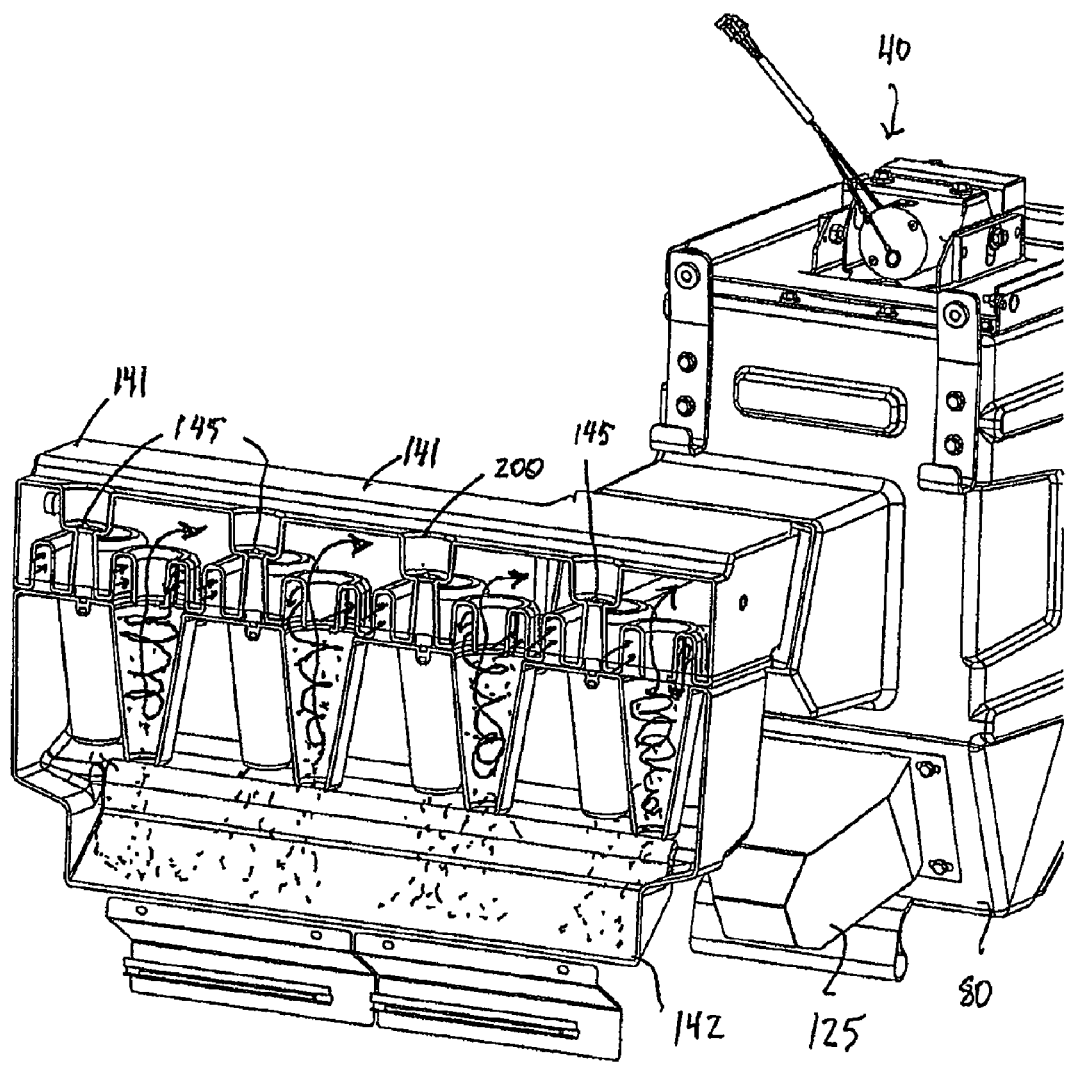

FIG. 22 depicts the airflow of FIG. 21 with a larger cut away portion of top housing 141. FIG. 23 depicts airflow through cyclone filter elements, such as during machine 10 operation. Dusty air is drawn through openings 20 and conducted through spiral-forming walls 193 to induce a rotational airflow within cones 162 Dust and debris is separated from the air stream and is deposited within lower housing 142.

FIG. 23 is a cross sectional view taken generally through openings 200 of top housing 141. This drawing illustrates that the top and bottom surfaces of top housing 141 are joined together to define an open cavity at openings 200 into which fasteners 145 and 144 (not shown) are introduced. Fastener 145 engages a seat defined within the open cavity to secure the housing portions together during machine 10 operation. A rotational molding process has been identified as well suited to form both housing portions of prefilter 17.

Figure 24:
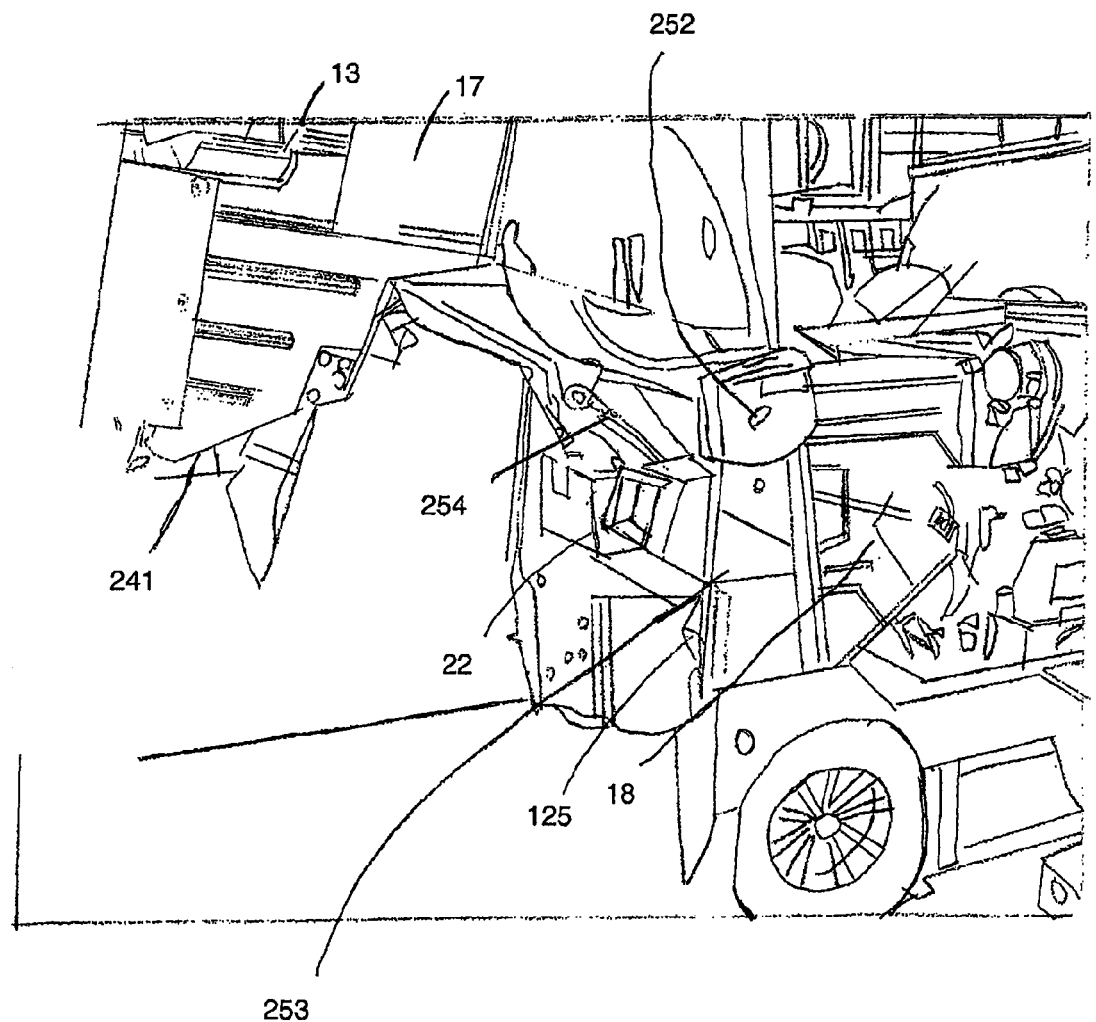
FIG. 24-26 illustrate the hopper assembly positioned in a dumping orientation.

FIG. 24 illustrates hopper 13 lifted into a dumping orientation whereby dirt and debris exits hopper 13 through opening 241. During a sweeping operation, brush 11 throws dirt and debris through opening 241. Hopper 13 is pivots about hinges 252 on machine arms 253 via hydraulic cylinder 254. As shown in the drawing, filter box 18 and prefilter 17 are separated when the hopper 13 is lifted. Fluid coupling between prefilter 17 and filter box 18 is restored when hopper 13 is lowered.

Figure 25:
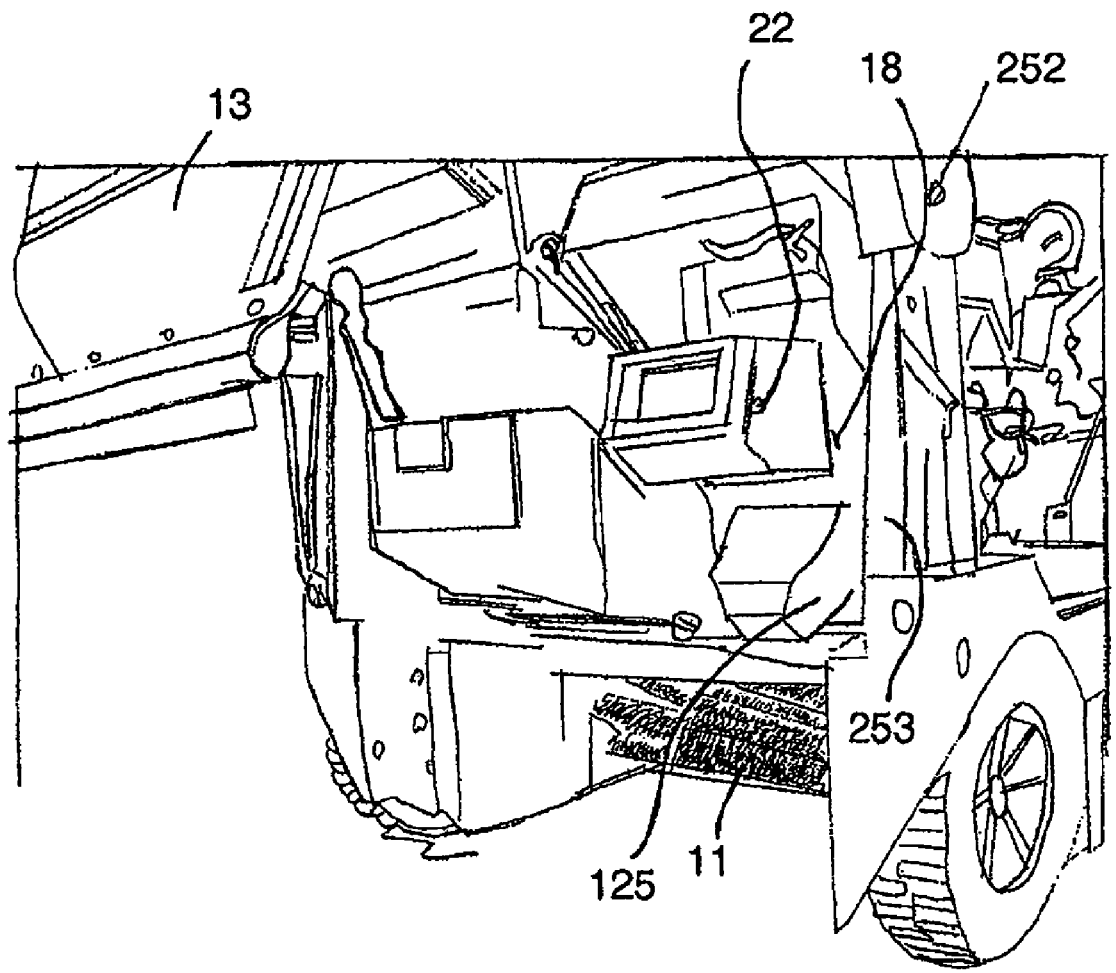

FIG. 25 is another illustration of hopper 13 lifted into an upright orientation. In this view, brush 11 is visible as is extension conduit 125, through which dust and debris flows from filter box 18 and is captured within hopper 13 during normal operation. As apparent, two couplings are made between hopper 13 and external filter box 18 during normal operation. A first coupling permits dusty air to flow into opening 22 and a second coupling allows dust and debris to flow from filter box 18 through conduit 125 and onto a surface of the hopper 13.

Figure 26:
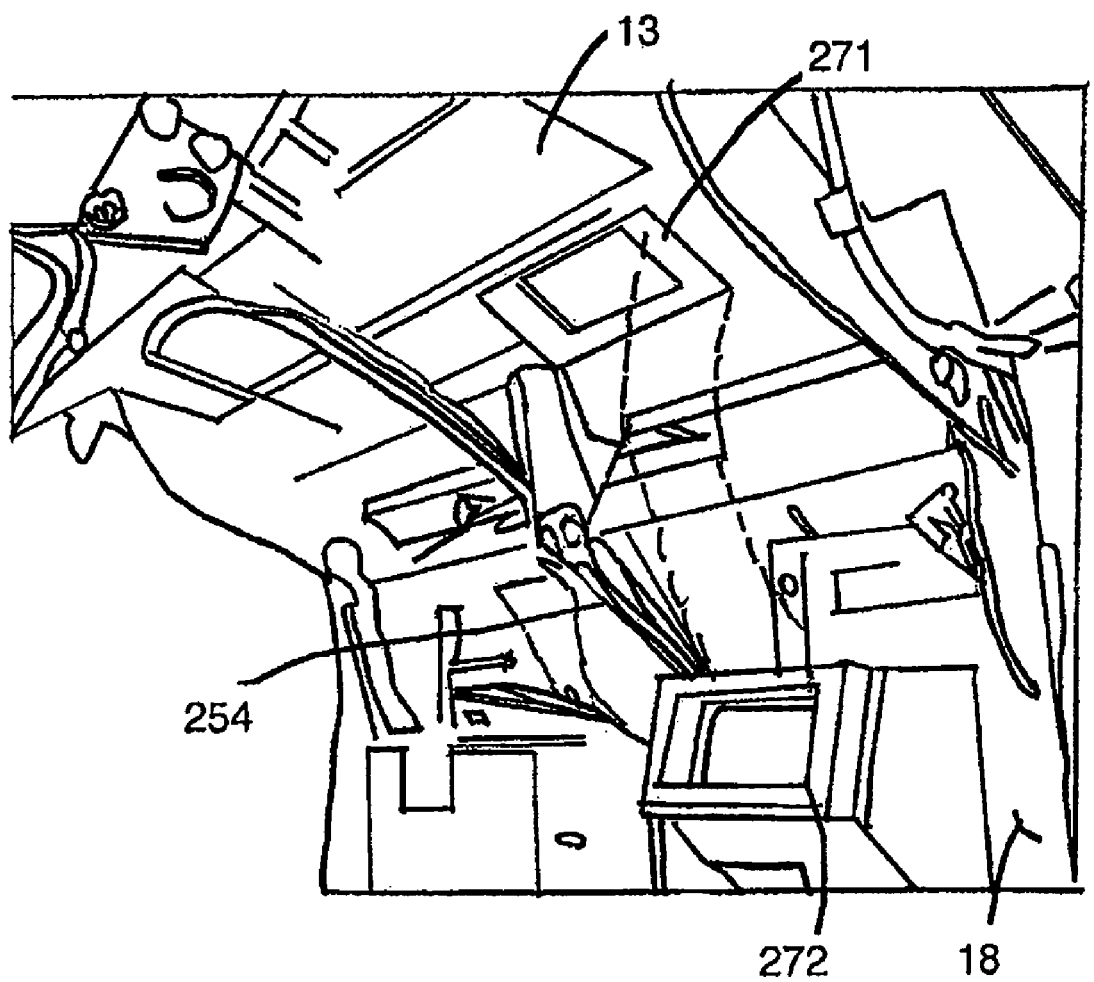

FIG. 26 is another illustration of hopper 13 lifted into an upright orientation relative to filter box 18. Visible in this view is the outlet 271 of prefilter 17 which mates with a coupling 262 at opening 22 of filter box 18. Coupling 262 may be a foam or other resilient material for containing airflow within the vacuum system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A filter system for a surface maintenance machine comprising:
    a hopper assembly including an air inlet and an air outlet and a hopper which receives debris thrown by a sweeping brush of the machine;
    a vacuum fan in communication with the hopper assembly which draws air through the hopper assembly inlet; and
    a prefilter assembly in fluid communication with the vacuum fan, said prefilter including a plurality of cyclone separators which separate some of the debris from the air flow, said prefilter assembly including a lower housing which captures an accumulation of debris from the plurality of cyclone separators, wherein the accumulation of debris captured in the lower housing of the prefilter assembly passes through a selectively-opened aperture and is deposited with the hopper.

2. A filter system for a surface maintenance machine comprising:
    a hopper assembly including an air inlet and an air outlet and a hopper which receives debris thrown by a sweeping brush of the machine;

a vacuum fan in communication with the hopper assembly which draws air through the hopper assembly inlet; and a prefilter assembly in fluid communication with the vacuum fan, said prefilter including a plurality of cyclone separators which separate some of the debris from the air flow, said prefilter assembly including a lower housing which captures an accumulation of debris from the plurality of cyclone separators, further comprising means for lifting the hopper assembly, and the hopper assembly and prefilter assembly are together lifted away from a ground surface during a hopper dumping procedure.

3. A filter system for a surface maintenance machine comprising a hopper assembly capturing debris thrown by a sweeping brush;

a vacuum fan drawing a flow of air through the hopper assembly;

a primary filter through which at least some of the air flow is drawn; and a prefilter through which at least some of the airflow is drawn prior to being introduced to the primary filter, said prefilter including a plurality of cyclone separators and a plurality of air inlets and air channels for directing some of the airflow to each of the plurality of cyclone separators, wherein the air channels direct some of the airflow in opposite directions relative to cones of the plurality of cyclone separators.

4. The system of claim 3 wherein the prefilter includes a surface for capturing debris from the plurality of cyclone separators.

5. The system of claim 4 wherein the prefilter includes means for selectively passing the debris from the plurality of cyclone separators to be deposited within a hopper.

6. The system of claim 5 wherein during a dumping procedure the prefilter and hopper assembly are rotated together about a hinge axis.

7. The system of claim 3 wherein the prefilter includes a plurality of rotomolded plastic housings.

8. The system of claim 7 wherein the plurality of cyclone separators are defined upon surfaces of the plurality of plastic housings.

9. The system of claim 7 wherein the spiral guide wails are defined on one of the plurality of housings.

10. A filter system for a mobile surface maintenance machine comprising:

a hopper assembly including a hopper adapted to receive debris from a sweeping brush;

a vacuum fan housed within a filter box, with a cylindrical filter contained within the filter box; and a plurality of cyclone separators contained within the hopper assembly, said hopper assembly supporting a airflow through the hopper, said plurality of cyclone separators and said cylindrical filter, said airflow resulting from activation of the vacuum fan, with said airflow being progressively filtered by said plurality of cyclone separators and then said cylindrical filter.

11. The system of claim 10 wherein said cylindrical filter is externally located relative to the hopper assembly.

12. The system of claim 11 wherein the vacuum fan is driven by a fan motor which is at least partially contained within the filter box.

13. The system of claim 10 wherein the plurality of cyclone separator includes an upper section defining portions of the channels and air inlets and a lower section define a debris cavity and a plurality of cones.

* * * * *

UNITED STATES PATENT AND TRADEMARK OFFICE
CERTIFICATE OF CORRECTION

PATENT NO. : 7,662,199 B2
APPLICATION NO. : 12/044874
DATED : February 16, 2010
INVENTOR(S) : Wellens et al.

Page 1 of 1

It is certified that error appears in the above-identified patent and that said Letters Patent is hereby corrected as shown below:

Col. 10, claim 9, line 1, delete "wails" and insert --walls-- therefor.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,662,199 B2  Page 1 of 1
APPLICATION NO. : 12/044874
DATED : February 16, 2010
INVENTOR(S) : Wellens et al.

It is certified that error appears in the above-identified patent and that said Letters Patent is hereby corrected as shown below:

Col. 10, claim 9, line 9, delete "wails" and insert --walls-- therefor.

This certificate supersedes the Certificate of Correction issued April 20, 2010.

Signed and Sealed this

Eleventh Day of May, 2010

David J. Kappos
*Director of the United States Patent and Trademark Office*